US007908625B2

(12) United States Patent
Robertson et al.

(10) Patent No.: US 7,908,625 B2

(45) Date of Patent: Mar. 15, 2011

(54) NETWORKED MULTIMEDIA SYSTEM

(76) Inventors: Neil C. Robertson, Lilburn, GA (US); David B. Lett, Duluth, GA (US); Samuel H. Russ, Lawrenceville, GA (US); Bohdan S. Prus, Alpharetta, GA (US); Michael A. Gaul, Lawrenceville, GA (US); Ajith N. Nair, Lawrenceville, GA (US)

( * ) Notice: Subject to any disclaimer, the term of this patent is extended or adjusted under 35 U.S.C. 154(b) by 0 days.

(21) Appl. No.: 10/342,670

(22) Filed: Jan. 15, 2003

(65) Prior Publication Data

US 2004/0068747 A1 Apr. 8, 2004

Related U.S. Application Data

(63) Continuation-in-part of application No. 10/263,160, filed on Oct. 2, 2002, and a continuation-in-part of application No. 10/263,449, filed on Oct. 2, 2002, and a continuation-in-part of application No. 10/263,270, filed on Oct. 2, 2002.

(60) Provisional application No. 60/416,155, filed on Oct. 4, 2002, provisional application No. 60/424,269, filed on Nov. 6, 2002.

(51) Int. Cl.
*H04N 7/20* (2006.01)

(52) U.S. Cl. .......... 725/82; 725/133; 725/141; 348/552; 398/106

(58) Field of Classification Search .............. 725/74–85, 725/132, 133, 140, 152; 348/734, 552; 340/825.69–825.72; 398/106, 107, 135
See application file for complete search history.

(56) References Cited

U.S. PATENT DOCUMENTS 4,215,366 A 7/1980 Davidson
4,290,081 A 9/1981 Foerster ............................ 358/4
4,439,784 A 3/1984 Furukawa et al.
4,535,355 A 8/1985 Arn et al.
4,540,958 A 9/1985 Neyens et al. .................. 332/16
4,578,533 A 3/1986 Pierce
4,644,526 A 2/1987 Wu .............................. 370/295
4,686,564 A 8/1987 Masuko et al.
4,706,121 A 11/1987 Young (Continued)

FOREIGN PATENT DOCUMENTS

EP 0912054 4/1999

(Continued)

OTHER PUBLICATIONS

Scientific-Atlanta, Inc. Pending U.S. Appl. No. 10/008,581, filed Nov. 13, 2001, entitled “Networked Subscriber Television Distribution,” Inventors: Samuel H. Russ, David B. Lett, Jonathan A. Robinson, and Michael A. Gaul.

(Continued)

*Primary Examiner* — Annan Q Shang

(74) *Attorney, Agent, or Firm* — Merchant & Gould

(57) ABSTRACT

Systems and methods are disclosed for providing downstream signals to a plurality of receiver networks. A receiver network (i.e., a networked multimedia system) includes a splitter/isolation module (SIM), a primary set-top terminal (STT), and at least one remote device. The remote devices communicate with the primary STT via the SIM over coaxial cable. Accordingly, the remote devices utilize some or all of the features including hardware and software that are included in the primary STT via the networked multimedia system.

25 Claims, 9 Drawing Sheets

U.S. PATENT DOCUMENTS 4,751,578 A 6/1988 Reiter et al.
4,885,803 A 12/1989 Hermann et al.
4,908,713 A 3/1990 Levine
4,916,532 A 4/1990 Streck et al.
4,963,994 A 10/1990 Levine
4,963,995 A 10/1990 Lang
5,010,299 A 4/1991 Nishizawa et al.
5,010,399 A 4/1991 Goodman et al. .............. 358/85
5,038,211 A 8/1991 Hallenbeck
5,048,054 A 9/1991 Eyuboglu et al.
5,155,591 A 10/1992 Wachob .......................... 725/35
5,168,372 A 12/1992 Sweetser ......................... 725/29
5,251,074 A 10/1993 Hamma et al. ............... 360/10.1
5,253,066 A 10/1993 Vogel
5,293,357 A 3/1994 Hallenbeck
5,381,449 A 1/1995 Jasper et al. .................. 375/298
5,406,626 A 4/1995 Ryan ................................ 380/9
5,412,416 A * 5/1995 Nemirofsky .................... 725/36
5,479,268 A 12/1995 Young et al.
5,481,542 A 1/1996 Logston et al.
5,508,815 A 4/1996 Levine
5,515,377 A 5/1996 Horne et al.
5,524,051 A 6/1996 Ryan ................................ 380/9
5,553,211 A 9/1996 Uotani
5,568,272 A 10/1996 Levine
5,574,964 A 11/1996 Hamlin
5,579,308 A 11/1996 Humpleman
5,590,195 A 12/1996 Ryan ................................ 380/9
5,600,364 A 2/1997 Hendricks et al.
5,600,573 A 2/1997 Hendricks et al.
5,600,707 A 2/1997 Miller, II
5,621,793 A 4/1997 Bednarek et al.
5,636,247 A 6/1997 Kamerman et al. .......... 375/260
5,638,423 A 6/1997 Grube et al.
5,642,384 A 6/1997 Ramesh ........................ 375/265
5,652,772 A 7/1997 Isaksson et al. .............. 375/367
5,657,072 A 8/1997 Aristides et al.
5,666,151 A 9/1997 Kondo et al.
5,682,206 A 10/1997 Wehmeyer et al.
5,699,105 A 12/1997 Chen et al.
5,701,383 A 12/1997 Russo et al. .................... 386/46
5,708,961 A 1/1998 Hylton et al. .................. 455/4.2
5,714,945 A * 2/1998 Sakuma et al. ............ 340/10.31
5,715,020 A 2/1998 Kuroiwa et al.
5,715,277 A 2/1998 Goodson et al.
5,732,359 A 3/1998 Baranowsky, II et al. . 455/552.1
5,734,437 A 3/1998 Back
5,751,806 A 5/1998 Ryan ................................ 380/9
5,758,257 A 5/1998 Herz et al.
5,760,822 A 6/1998 Coutinho
5,774,527 A 6/1998 Handelman et al.
5,778,181 A 7/1998 Hidary et al.
5,787,472 A 7/1998 Dan et al. ...................... 711/134
5,793,413 A * 8/1998 Hylton et al. ................... 725/81
5,793,414 A 8/1998 Shaffer
5,796,442 A 8/1998 Gove et al.
5,801,787 A 9/1998 Schein et al.
5,805,763 A 9/1998 Lawler et al.
5,808,659 A 9/1998 Coutinho et al.
5,809,204 A 9/1998 Young et al.
5,815,794 A * 9/1998 Williams ...................... 725/125
5,828,403 A * 10/1998 DeRodeff et al. ............. 725/131
5,835,128 A * 11/1998 Macdonald et al. ............ 725/81
5,835,602 A 11/1998 Lang ............................. 380/268
5,838,873 A 11/1998 Blatter et al. ................... 386/95
5,850,218 A 12/1998 LaJoie et al.
5,850,340 A 12/1998 York ............................... 700/83
5,851,149 A 12/1998 Xidos et al.
5,867,485 A 2/1999 Chambers et al.
5,872,644 A 2/1999 Yamazaki et al.
5,883,677 A 3/1999 Hofmann ...................... 348/584
5,886,732 A * 3/1999 Humpleman ................... 725/49
5,886,753 A 3/1999 Shinyagaito et al.
5,915,068 A 6/1999 Levine
5,920,801 A 7/1999 Thomas et al.
5,930,247 A 7/1999 Miller, II et al.
5,936,660 A 8/1999 Gurantz
5,940,073 A 8/1999 Klosterman et al.
5,940,387 A 8/1999 Humpleman
5,970,053 A 10/1999 Schick et al. ................. 370/252
5,970,386 A 10/1999 Williams
5,983,068 A * 11/1999 Tomich et al. .................. 725/32
5,990,927 A 11/1999 Hendricks et al.
5,995,258 A 11/1999 Weber et al.
5,999,622 A 12/1999 Yasukawa et al. .............. 705/51
6,005,861 A 12/1999 Humpleman
6,005,876 A 12/1999 Cimini, Jr. et al. ........... 370/525
6,006,257 A 12/1999 Slezak
6,014,546 A * 1/2000 Georges et al. ................. 725/79
6,018,768 A 1/2000 Ullman et al.
6,023,603 A 2/2000 Matsubara ..................... 455/3.2
6,026,150 A 2/2000 Frank
6,037,998 A 3/2000 Usui et al.
6,052,556 A 4/2000 Sampsell
6,055,355 A 4/2000 Lee ................................ 386/70
6,061,449 A 5/2000 Candelore et al.
6,069,621 A 5/2000 Schupak ....................... 715/717
6,073,122 A 6/2000 Wool
6,091,320 A * 7/2000 Odinak .................... 340/310.01
6,091,767 A 7/2000 Westerman ................... 375/240
6,100,883 A * 8/2000 Hoarty .......................... 715/721
6,100,936 A 8/2000 Jordan et al.
6,115,456 A 9/2000 Nolde ...................... 379/102.01
6,118,873 A 9/2000 Lotspiech et al.
6,119,154 A 9/2000 Weaver et al. ................ 709/219
6,122,482 A 9/2000 Green, Sr. et al. ............. 455/3.2
6,125,103 A 9/2000 Bauml et al. .................. 370/203
6,133,912 A 10/2000 Montero ....................... 715/716
6,151,493 A 11/2000 Sasakura et al.
6,166,744 A 12/2000 Jaszlics et al.
6,169,543 B1 1/2001 Wehmeyer
6,172,712 B1 1/2001 Beard .......................... 348/552
6,175,343 B1 1/2001 Mitchell et al.
6,175,551 B1 1/2001 Awater et al. ................. 370/210
6,177,931 B1 1/2001 Alexander et al.
6,177,963 B1 1/2001 Foye et al.
6,181,784 B1 1/2001 Duran et al. ............... 379/93.21
6,182,287 B1 1/2001 Schneidewend et al.
6,188,700 B1 2/2001 Kato et al. .................... 370/477
6,202,211 B1 3/2001 Williams, Jr.
6,208,669 B1 3/2001 Cimini, Jr. et al. ........... 370/525
6,215,526 B1 4/2001 Barton et al. ................. 348/473
6,219,839 B1 4/2001 Sampsell
6,229,895 B1 5/2001 Son et al.
6,230,162 B1 5/2001 Kumar et al. .............. 707/104.1
6,233,389 B1 5/2001 Barton et al. ................... 386/46
6,236,653 B1 * 5/2001 Dalton et al. ................. 370/352
6,240,555 B1 5/2001 Daniel et al.
6,299,895 B1 5/2001 Son et al.
6,243,142 B1 6/2001 Mugura et al.
6,263,503 B1 7/2001 Margulis
6,285,746 B1 9/2001 Duran et al. ............... 379/93.21
6,286,140 B1 9/2001 Ivanyi
6,286,142 B1 9/2001 Ehreth
6,305,017 B1 10/2001 Satterfield
6,310,886 B1 10/2001 Barton .......................... 370/462
6,314,146 B1 11/2001 Tellado et al. ................ 375/346
6,317,884 B1 11/2001 Eames et al. .................... 725/78
6,324,338 B1 11/2001 Wood et al. ..................... 386/83
6,327,418 B1 12/2001 Barton ............................ 386/46
6,330,334 B1 12/2001 Ryan ............................ 380/237
6,333,937 B1 12/2001 Ryan ............................ 370/468
6,353,929 B1 3/2002 Houston
6,356,309 B1 3/2002 Masaki et al. ............. 348/439.1
6,377,782 B1 * 4/2002 Bishop et al. ................ 455/3.01
6,378,130 B1 4/2002 Adams ............................ 725/95
6,411,820 B1 6/2002 Margarit et al.
6,415,031 B1 7/2002 Colligan et al.
6,418,558 B1 7/2002 Roberts et al.
6,421,706 B1 7/2002 McNeill et al.
6,424,947 B1 7/2002 Tsuria et al.
6,438,165 B2 8/2002 Normile ....................... 375/240
6,441,832 B1 8/2002 Tao et al.
6,442,755 B1 8/2002 Lemmons et al.
6,452,923 B1 * 9/2002 Gerszberg et al. ............ 370/352
6,459,427 B1 10/2002 Mao et al. ..................... 725/109
6,473,559 B1 10/2002 Knudson et al.

6,481,013 B1 * 11/2002 Dinwiddie et al. ............. 725/80
6,483,548 B1 11/2002 Allport
6,493,875 B1 * 12/2002 Eames et al. .................... 725/81
6,496,980 B1 12/2002 Tillman et al.
6,505,348 B1 1/2003 Knowles et al.
6,516,029 B1 2/2003 Wang
6,526,581 B1 * 2/2003 Edson ............................ 725/74
6,530,085 B1 3/2003 Perlman
6,535,717 B1 3/2003 Matsushima et al.
6,536,041 B1 3/2003 Knudson et al.
6,542,610 B2 4/2003 Traw et al.
6,556,557 B1 4/2003 Cimini, Jr. et al. ........... 370/342
6,567,981 B1 5/2003 Jeffrey
6,578,070 B1 6/2003 Weaver et al.
6,588,017 B1 * 7/2003 Calderone ..................... 725/120
6,594,798 B1 7/2003 Chou et al.
6,614,936 B1 9/2003 Wu et al.
6,622,304 B1 * 9/2003 Carhart ........................... 725/74
6,622,307 B1 9/2003 Ho
6,631,522 B1 10/2003 Erdelyi .......................... 725/53
6,637,031 B1 10/2003 Chou
6,675,385 B1 1/2004 Wang ............................. 725/39
6,681,326 B2 1/2004 Son et al.
6,697,426 B1 2/2004 Van Der Schaar et al.
6,697,489 B1 2/2004 Candelore
6,704,028 B2 3/2004 Wugofski
6,711,132 B2 3/2004 Lazarus
6,735,221 B1 5/2004 Cherubini
6,735,312 B1 5/2004 Abdalla et al.
6,754,905 B2 6/2004 Gordon et al.
6,757,906 B1 * 6/2004 Look et al. ...................... 725/45
6,766,526 B1 7/2004 Ellis
6,769,127 B1 7/2004 Bonomi et al. ................. 725/39
6,771,908 B2 8/2004 Eijk et al.
6,785,258 B1 8/2004 Garcia, Jr. et al. ............ 370/344
6,785,901 B1 8/2004 Horiwitz et al. ................ 725/25
6,788,740 B1 9/2004 van der Schaar et al. ..... 375/240
6,789,106 B2 9/2004 Eyer et al.
6,791,995 B1 * 9/2004 Azenkot et al. ............... 370/436
6,795,205 B1 9/2004 Gacek
6,798,838 B1 9/2004 Ngo ......................... 375/240.19
6,804,357 B1 10/2004 Ikonen et al.
6,816,194 B2 11/2004 Zhang et al.
6,816,904 B1 11/2004 Ludwig et al. ................ 709/226
6,845,486 B2 1/2005 Yamada et al.
6,864,778 B2 3/2005 Musschebroeck et al.
6,868,292 B2 3/2005 Ficco et al.
6,870,570 B1 3/2005 Bowser
6,889,385 B1 5/2005 Rakib et al.
6,904,522 B1 6/2005 Benardeau et al.
6,915,529 B1 * 7/2005 Suematsu et al. ............... 725/78
6,922,843 B1 7/2005 Herrington et al. ............. 725/30
6,930,788 B1 8/2005 Iwamoto et al.
6,941,515 B1 9/2005 Wilkins
6,954,897 B1 10/2005 Noguchi et al.
6,957,344 B1 10/2005 Goldshlag et al.
6,978,474 B1 12/2005 Sheppard et al. ............... 725/83
6,996,623 B1 2/2006 Kawano et al.
6,996,837 B1 2/2006 Miura et al.
7,020,890 B1 3/2006 Suematsu et al.
7,020,892 B2 3/2006 Levesque et al. ............... 725/89
6,950,517 B2 5/2006 Candelore ....................... 725/87
7,039,169 B2 5/2006 Jones ......................... 379/93.02
7,039,245 B1 5/2006 Hamery
7,042,526 B1 5/2006 Borseth
7,047,305 B1 5/2006 Brooks et al.
7,054,289 B1 5/2006 Foster et al.
7,065,781 B1 6/2006 Entwistle ...................... 725/135
7,093,295 B1 8/2006 Saito
7,114,174 B1 9/2006 Brooks et al. ................. 725/105
7,116,894 B1 10/2006 Chatterton
7,127,734 B1 10/2006 Amit
7,130,576 B1 10/2006 Gurantz et al. .............. 455/3.02
7,139,398 B2 11/2006 Candelore et al.
7,140,033 B1 11/2006 Durden et al.
7,146,628 B1 12/2006 Gordon et al.
7,155,012 B2 12/2006 Candelore et al.
7,184,550 B2 2/2007 Graunke
7,185,355 B1 2/2007 Ellis et al. ....................... 725/46
7,190,901 B2 3/2007 Farmer et al.
7,209,667 B2 4/2007 Lindblad
7,218,738 B2 5/2007 Pedlow, Jr. et al. ........... 380/218
7,222,358 B2 5/2007 Levinson et al.
7,231,516 B1 * 6/2007 Sparrell et al. ................ 713/156
7,233,669 B2 6/2007 Candelore
7,234,155 B1 6/2007 Kay et al. ........................ 725/60
7,260,829 B1 8/2007 Hendricks et al.
7,278,154 B2 10/2007 Harrison et al.
7,305,700 B2 12/2007 Boynton et al. .................. 726/4
7,310,355 B1 12/2007 Krein et al.
7,313,811 B1 * 12/2007 Sheppard et al. ............. 725/143
7,336,787 B2 2/2008 Unger et al. .................. 380/217
7,346,120 B2 3/2008 McCorkle ..................... 375/295
7,346,134 B2 3/2008 Smith ........................... 375/346
7,346,233 B2 3/2008 McCorkle ..................... 375/295
7,350,225 B2 * 3/2008 Ovadia, Shlomo ........... 725/107
7,360,233 B2 4/2008 Russ et al.
7,360,235 B2 4/2008 Davies et al.
7,366,914 B2 4/2008 Graunke ....................... 713/190
7,392,389 B2 6/2008 Kori ............................. 713/170
7,434,246 B2 10/2008 Florence ......................... 725/46
7,487,532 B2 2/2009 Robertson et al. ............ 725/111
7,516,470 B2 4/2009 Russ et al. ...................... 725/48
7,545,935 B2 6/2009 Claussen et al. .............. 380/200
7,603,684 B1 10/2009 Ellis ............................... 725/39
7,849,486 B2 12/2010 Russ et al.
2001/0005906 A1 * 6/2001 Humpleman ................... 725/82
2001/0011373 A1 8/2001 Inoue ............................. 725/50
2001/0017920 A1 8/2001 Son et al.
2001/0030664 A1 10/2001 Shulman et al.
2001/0039660 A1 * 11/2001 Vasilevsky et al. ............. 725/78
2002/0002707 A1 1/2002 Ekel et al.
2002/0007485 A1 1/2002 Rodriguez et al.
2002/0007493 A1 1/2002 Butler et al.
2002/0010936 A1 1/2002 Adam
2002/0019984 A1 2/2002 Rakib
2002/0035726 A1 3/2002 Corl
2002/0035729 A1 3/2002 Diep
2002/0040475 A1 4/2002 Yap et al.
2002/0044762 A1 4/2002 Wood et al.
2002/0051200 A1 5/2002 Chang et al.
2002/0051581 A1 5/2002 Takeuchi et al.
2002/0056112 A1 5/2002 Dureau et al.
2002/0059615 A1 5/2002 Okawara et al.
2002/0059617 A1 5/2002 Terakado et al.
2002/0059623 A1 5/2002 Rodriguez et al. .............. 725/91
2002/0059637 A1 5/2002 Rakib
2002/0059642 A1 5/2002 Russ et al. .................... 725/135
2002/0066101 A1 5/2002 Gordon et al.
2002/0067437 A1 6/2002 Tsubouchi et al.
2002/0069417 A1 * 6/2002 Kliger et al. .................... 725/78
2002/0083438 A1 6/2002 So et al.
2002/0087996 A1 7/2002 Bi et al.
2002/0090198 A1 7/2002 Rosenberg et al.
2002/0095673 A1 7/2002 Leung et al.
2002/0095689 A1 7/2002 Novak
2002/0100041 A1 7/2002 Rosenbert et al.
2002/0104001 A1 8/2002 Lotspiech et al.
2002/0108109 A1 8/2002 Harris et al. .................... 725/32
2002/0108121 A1 8/2002 Alao et al.
2002/0116626 A1 8/2002 Wood
2002/0122045 A1 9/2002 Woodson et al.
2002/0133558 A1 9/2002 Fenno et al.
2002/0137517 A1 9/2002 Williams et al.
2002/0138830 A1 9/2002 Nagaoka et al.
2002/0141582 A1 10/2002 Kocher et al.
2002/0144262 A1 10/2002 Plotnick et al.
2002/0146237 A1 10/2002 Safadi ............................ 386/94
2002/0154892 A1 10/2002 Hoshen et al.
2002/0157112 A1 10/2002 Kuhn
2002/0166124 A1 11/2002 Gurantz et al.
2002/0174430 A1 11/2002 Ellis et al.
2002/0174433 A1 11/2002 Baumgartner et al.
2002/0174444 A1 11/2002 Gatto et al.
2002/0178445 A1 11/2002 Eldering
2002/0187779 A1 12/2002 Freeny
2002/0194596 A1 12/2002 Srivastava
2002/0196941 A1 12/2002 Isaacson et al. .............. 380/231

2002/0198762 A1 12/2002 Donato ........................... 705/10
2003/0005300 A1 1/2003 Noble et al.
2003/0005452 A1 1/2003 Rodriguez ...................... 725/86
2003/0009763 A1 1/2003 Crinon et al.
2003/0014750 A1 1/2003 Kamen ........................... 725/25
2003/0026423 A1 2/2003 Unger et al.
2003/0028886 A1 2/2003 Wang et al.
2003/0028890 A1 2/2003 Swart et al.
2003/0044165 A1 3/2003 Wood et al.
2003/0063003 A1 4/2003 Bero et al.
2003/0063814 A1 4/2003 Herley
2003/0069964 A1 4/2003 Shteyn et al. ................. 709/225
2003/0074565 A1 4/2003 Wasilewski et al. .......... 713/182
2003/0093812 A1 5/2003 Chang et al. .................. 725/133
2003/0097563 A1 5/2003 Moroney et al.
2003/0097655 A1 5/2003 Novak
2003/0097663 A1 5/2003 Russ et al. .................... 725/132
2003/0108199 A1 6/2003 Pinder et al.
2003/0108336 A1 6/2003 Schramel
2003/0135859 A1 7/2003 Putterman et al. .............. 725/78
2003/0142664 A1 7/2003 Gerszberg et al.
2003/0145336 A1 7/2003 Matsuzaki et al.
2003/0149986 A1 8/2003 Mayfield et al.
2003/0149991 A1 8/2003 Reidhead et al.
2003/0154477 A1 8/2003 Hassell et al.
2003/0159140 A1 8/2003 Candelore
2003/0159157 A1 8/2003 Chan
2003/0177495 A1 9/2003 Needham et al.
2003/0181160 A1 9/2003 Hirsch
2003/0192047 A1 10/2003 Gaul et al. ...................... 725/39
2003/0192061 A1 10/2003 Hwangbo et al. ............. 725/138
2003/0202772 A1 10/2003 Dow et al.
2003/0204856 A1 10/2003 Buxton
2003/0207672 A1 11/2003 Dang et al.
2003/0233667 A1 12/2003 Umipig et al.
2003/0235308 A1 12/2003 Boynton et al. .............. 380/270
2003/0237093 A1 12/2003 Marsh ............................ 725/46
2004/0003393 A1 1/2004 Gutta et al. ..................... 725/25
2004/0003398 A1 1/2004 Donian et al.
2004/0012717 A1 1/2004 Robertson et al. ............ 348/564
2004/0017913 A1 1/2004 Hawkes et al. ................ 380/37
2004/0025179 A1 2/2004 Russ et al. ...................... 725/46
2004/0028216 A1 2/2004 Freyman
2004/0032902 A1 2/2004 Koifman et al.
2004/0032950 A1 2/2004 Graunke
2004/0034874 A1 2/2004 Hord et al.
2004/0040035 A1 2/2004 Carlucci et al.
2004/0049793 A1 3/2004 Chou ............................. 725/87
2004/0051638 A1 3/2004 Green
2004/0054771 A1 3/2004 Roe et al.
2004/0060072 A1 3/2004 Klein ............................ 725/127
2004/0064714 A1 4/2004 Carr
2004/0068739 A1 4/2004 Russ
2004/0068744 A1 4/2004 Claussen et al. ................ 725/81
2004/0068747 A1 4/2004 Robertson
2004/0068752 A1 4/2004 Parker ........................... 725/120
2004/0068753 A1 4/2004 Robertson et al. ............ 725/126
2004/0068754 A1 4/2004 Russ
2004/0078825 A1 4/2004 Murphy
2004/0090971 A1 5/2004 Anderson
2004/0100897 A1 5/2004 Shattil ........................... 370/206
2004/0104926 A1 6/2004 Murray et al.
2004/0107445 A1 6/2004 Amit
2004/0109497 A1 6/2004 Koval
2004/0117483 A1 6/2004 Singer et al. .................. 709/225
2004/0117831 A1 6/2004 Ellis et al. ....................... 725/53
2004/0128681 A1 7/2004 Hancock
2004/0128682 A1 7/2004 Liga
2004/0133911 A1 7/2004 Russ et al. ...................... 725/69
2004/0163130 A1 8/2004 Gray et al. .................... 725/132
2004/0172658 A1 9/2004 Rakib et al.
2004/0177369 A1 9/2004 Akins, III ....................... 725/31
2004/0177381 A1 9/2004 Kliger et al.
2004/0220791 A1 11/2004 Lamkin et al.
2004/0221304 A1 11/2004 Sparrell
2004/0221308 A1 11/2004 Cuttner et al.
2004/0250272 A1 12/2004 Durden et al. ................. 725/25
2004/0250273 A1 12/2004 Swix et al. ...................... 725/25
2004/0255326 A1 12/2004 Hicks et al.
2004/0257976 A1 12/2004 Alsobrook et al.
2004/0261100 A1 12/2004 Huber et al.
2004/0261126 A1 12/2004 Addington et al.
2005/0004873 A1 1/2005 Pou et al. ........................ 705/51
2005/0005287 A1 1/2005 Claussen ......................... 725/31
2005/0022248 A1 1/2005 Robertson et al.
2005/0028190 A1 2/2005 Rodriguez et al.
2005/0028208 A1* 2/2005 Ellis et al. ....................... 725/58
2005/0030910 A1 2/2005 Robertson et al. ............ 370/276
2005/0042999 A1 2/2005 Rappaport
2005/0044762 A1 3/2005 Atluri
2005/0050557 A1 3/2005 Gabry
2005/0063422 A1 3/2005 Lazar et al.
2005/0065780 A1 3/2005 Wiser et al. ................... 704/201
2005/0073945 A1 4/2005 Garcia, Jr. et al. ............ 370/206
2005/0076357 A1 4/2005 Fenne ............................. 725/14
2005/0155052 A1 7/2005 Ostrowska
2005/0234992 A1 10/2005 Haberman ................. 707/104.1
2005/0235323 A1 10/2005 Ellis et al.
2005/0251824 A1 11/2005 Thomas et al.
2005/0251827 A1 11/2005 Ellis et al.
2005/0262542 A1 11/2005 DeWeese et al.
2006/0010481 A1 1/2006 Wall et al. ..................... 725/151
2006/0069645 A1 3/2006 Chen et al.
2006/0080360 A1 4/2006 Young et al. ............... 707/104.1
2006/0095939 A1 5/2006 Jutzi ............................... 725/78
2006/0117354 A1 6/2006 Schutte et al. .................. 725/78
2006/0150225 A1 7/2006 Hegg et al. ...................... 725/89
2006/0184967 A1 8/2006 Maynard et al. ................ 725/46
2006/0218581 A1 9/2006 Ostrowska et al. ............. 725/38
2006/0218591 A1 9/2006 Billmaier et al.
2006/0259584 A1 11/2006 Watson et al.
2007/0022307 A1 1/2007 Ferrari
2007/0077038 A1 4/2007 Wall et al.
2007/0079341 A1 4/2007 Russ et al. ...................... 725/89
2007/0094698 A1 4/2007 Bountour et al. ............. 725/132
2007/0143776 A1 6/2007 Russ .............................. 725/14
2007/0300258 A1 12/2007 O'Connor et al. .............. 725/44
2008/0066085 A1 3/2008 Davies et al. ................. 719/321
2008/0072272 A1 3/2008 Robertson et al.
2008/0148325 A1 6/2008 Robertson et al. .............. 725/98
2008/0201758 A1 8/2008 Davies et al. ................ 725/133
2008/0271094 A1* 10/2008 Kliger et al. .................... 725/80
2008/0301738 A1 12/2008 Davies et al. ................... 725/87
2009/0077586 A1 3/2009 Wall et al. ....................... 725/39
2009/0083819 A1 3/2009 Robertson et al. ............ 725/118
2009/0150922 A1 6/2009 Russ et al.
2009/0193452 A1 7/2009 Russ et al.
2010/0175093 A1 7/2010 Arnold et al.

FOREIGN PATENT DOCUMENTS

EP 0989557 3/2000
EP 1028551 8/2000
EP 107600 6/2001
EP 1117214 7/2001
EP 1175087 7/2001
EP 1145244 A1 10/2001
EP 1213919 6/2002
EP 1443766 8/2004
EP 1463324 9/2004
WO WO 95/25402 9/1995
WO WO 96/19079 6/1996
WO WO 98/26584 6/1998
WO WO 98/37648 8/1998
WO WO 99/01984 1/1999
WO WO 99/35844 7/1999
WO WO 99/65244 12/1999
WO WO 00/04707 1/2000
WO WO 00/45590 3/2000
WO WO 00/35201 6/2000
WO WO 01/01677 1/2001
WO WO 01/47234 6/2001
WO WO 01/56286 8/2001
WO WO 01/56297 8/2001
WO WO 01/74003 10/2001
WO WO 01/78382 10/2001
WO WO 01/86948 11/2001
WO WO 02/07378 1/2002
WO WO 02/11418 2/2002

| WO | WO 02/11446 | 2/2002 |
|---|---|---|
| WO | WO 02/17642 | 2/2002 |
| WO | WO 02/19623 | 3/2002 |
| WO | WO 02/47388 | 6/2002 |
| WO | WO 02/097997 | 12/2002 |
| WO | WO 03/032620 | 4/2003 |
| WO | WO 03/039154 | 5/2003 |
| WO | WO 2004/023717 | 3/2004 |
| WO | WO 2004/032514 | 4/2004 |
| WO | WO 2004/036808 | 4/2004 |
| WO | WO 2004/036892 | 4/2004 |
| WO | WO 2004/064296 | 7/2004 |
| WO | WO 2004/098190 | 11/2004 |
| WO | WO 2005/034515 | 4/2005 |
| WO | WO 2006/093741 | 9/2006 |

OTHER PUBLICATIONS

Kerr, G., "A Review of Fully Interactive Video on Demand" Signal Processing. Image Communication, Elsevier Science Publishers, Amsterdam, NL, vol. 8, No. 3, Apr. 1996 , pp. 173-190, XP004047063 ISSN: 0923-5965.

Alexis De Lattre et al., Videolan Streaming (online) Feb. 12, 2005, pp. 1-14.

Alexis De Lattre et al., Videolan Streaming Howto, 2005, pp. 1-61.

Microsoft Computer Dictionary, 1999, Microsoft Press, 4th Edition, p. 123.

U.S. Appl. No. 09/332,244; Ellis et al., filed Jun. 11, 1999 is included by reference by 2005/0028208.

U.S. Appl. No. 10/008,581, filed Nov. 13, 2001, Entitled "Networked Subscriber Television Distribution," Inventors: Russ, et al.

U.S. Appl. No. 10/104,921, filed Mar. 22, 2002, Entitled "Exporting Data from a Digital Home Communication Terminal to a Client Device," Inventors: Gaul, et al.

U.S. Appl. No. 10/212,017, filed Aug. 2, 2002, Entitled "Locally-Updated Interactive Program Guide," Inventors: Russ et al.

U.S. Appl. No. 10/263,270, filed Oct. 2, 2002, Entitled "Video Transmission Systems and Methods for a Home Network," Inventors: Robertson et al.

U.S. Appl. No. 10/403,485, filed Mar. 31, 2003, Entitled "Networked Multimedia System having a Multi-Room Interactive Network Guide," Inventors: Russ et al.

U.S. Appl. No. 10/998,879, filed Nov. 29, 2004, Entitled "Consolidating Video on Demand (VOD) Services with Multi-Room Personal Video Recording (MR-PVR) Services," Inventors: Schutte, et al.

U.S. Appl. No. 10/294,947, filed Nov. 14, 2002, Entitled "Networked Subscriber Television Distribution," Inventors: Russ, et al.

U.S. Appl. No. 10/676,968, filed Oct. 1, 2003, Entitled "Proximity Detection using Wireless Connectivity in a Communications System," Inventors: Claussen, et al.

U.S. Appl. No. 11/069,440, filed Mar. 1, 2005, Entitled "Interactive Network Guide with Parental Monitoring," Inventors: Ostrowska, et al.

U.S. Appl. No. 10/924,077, filed Aug. 23, 2004, Entitled "Full Duplex Wideband Communications System for a Local Coaxial Network," Inventors: Robertson, et al.

U.S. Appl. No. 10/842,823, filed May 11, 2004, Entitled "Networked Multimedia Overlay System," Inventor: P. J. Claussen.

U.S. Appl. No. 11/564,347, filed Nov. 29, 2006, Entitled "Viewer Data Collection in a Multi-Room Network," Inventor: Russ, Samuel H.

U.S. Appl. No. 11/162,232, filed Sep. 2, 2005, Entitled "Multiroom Point of Deployment Module," Inventors: Wall, et al.

U.S. Appl. No. 10/923,948, filed Aug. 23, 2004, Entitled "Optimization of a Full Duplex Wideband Communications System," Inventors: Robertson, et al.

U.S. Appl. No. 11/069,439, filed Mar. 1, 2005, Entitled "Parental Control for a Networked Multi-Room System," Inventors: Ostrowska, et al.

U.S. Appl. No. 10/036,329, filed Feb. 25, 2008, Entitled "Full Duplex Wideband Modem Communications system for a Local Coaxial Network," Inventors: Robertson, et al.

Kerr, G., " A Review of Fully Interactive Video on Demand" Signal Processing Image Communication, Elsevier Science Publishers, Amsterdam, NL, vol., 8, No. 3, Apr. 1996, pp. 173-190, XP004047063 Issn: 09235965.

Alexis De Lattre er al., Videolan Streaming (online) Feb. 12, 2005, pp. 1-14. (Cited by Examiner, no copy available).

Microsoft Computer Dictionary, 1999, Microsoft Press, 4th Edition, p. 123.

Alexis De Lattre et al., Videolan Streaming How to, 2005, pp. 1-61. (Cited by Examiner, no copy available).

SCTE, "POD Copy Protection System," SCTE Society of Cable Telecommunications Engineers, [Online] 31 Dec. 2004, pp. 1-68, XP002414048, http://www.scte.org/documents/pdf/ANSISCTE412004.pdf.

Delta Beta In-Flight, www.deltabeta.com, retrieved from the internet on Jul. 17, 2008.

SCTE, "Client-Based Digital Program Insertion Business Goal," DVS/632rl, Mar. 27, 2004.

SCTE, "Working Group Work Plan 5," DVS 177, Sep. 1, 1998.

SCTE, "Proposed Amendment of SCTE 30 2001 Digital Program Insertion Splicing API," DVS 638r3, Feb. 4, 2005.

Broadcast Engineering, "Digital Program Insertion," Business Models, Jul. 1, 2002.

nCUBE, "Digital Program Insertion," nCUBE, May 2001.

Matsushita Electric Industrial Co., Ltd. "DVB Call for Proposals for Content Protection & Copy Management Technologies," NetDRM Technology, XP002349078, Oct. 19, 2001, pp. 1-44.

Written Opinion mailed Nov. 7, 2005 in PCT Application No. PCT/US2005/016290.

International Search Report dated Oct. 31, 2005 in PCT Application No. PCT/US2005/016290.

EP Communication dated Jul. 12, 2007 in Application No. 05 748 223.4-1241.

International Preliminary Examination Report dated Dec. 21, 2005 in PCT/US2003/32527.

Written Opinion mailed Dec. 10, 2004 in PCT/US2003/32527.

International Search Report dated Nov. 10, 2004 in PCT/US2003/32527.

International Preliminary Examination Report dated Jan. 18, 2006 in PCT/US2003/33686.

Written Opinion mailed Jun. 3, 2005 in PCT/US2003/33686.

International Search Report dated Feb. 6, 2004 in PCT/US2003/33686.

Canadian Office Action dated May 30, 2008 in Application No. 2,520,505.

Canadian Office Action dated Sep. 4, 2008 in Application No. 2,501,865.

International Search Report dated Sep. 29, 2006 in PCT/US2006/006199.

Written Opinion dated Oct. 12, 2006 in PCT/US2006/006199.

International Search Report dated Jan. 10, 2007 in PCT/US2006/033967.

Written Opinion mailed Mar. 2, 2007 in PCT/US2006/033967.

EP Communication dated Oct. 14, 2009 in Application No. 03 777 604.4-1241.

Supplementary European Search Report dated Jun. 18, 2009 in Application No. 03 777 604.4.

EP Communication dated May 27, 2009 in Application No. 03 774 942.1.

Supplementary European Search Report dated Feb. 6, 2009 in Application No. 03 774 942.1-1241.

International Search Report dated Mar. 1, 2005 in OCT/US2004/032389.

U.S. Official Action mailed Dec. 5, 2003 in U.S. Appl. No. 10/235,201.

U.S. Official Action mailed May 7, 2004 in U.S. Appl. No. 10/235,201.

U.S. Official Action mailed Sep. 10, 2004 in U.S. Appl. No. 10/437,556.

U.S. Official Action mailed Mar. 21, 2005 in U.S. Appl. No. 10/212,017.

U.S. Official Action mailed Jun. 15, 2005 in U.S. Appl. No. 10/437,556.

U.S. Official Action mailed Jul. 27, 2005 in U.S. Appl. No. 10/235,201.
U.S. Official Action mailed Oct. 19, 2005 in U.S. Appl. No. 10/212,017.
U.S. Official Action mailed Jan. 11, 2006 in U.S. Appl. No. 10/235,201.
U.S. Official Action mailed Jan. 30, 2006 in U.S. Appl. No. 10/437,556.
U.S. Official Action mailed Mar. 13, 2006 in U.S. Appl. No. 10/008,581.
U.S. Official Action mailed Apr. 19, 2006 in U.S. Appl. No. 10/212,017.
U.S. Official Action mailed Jun. 28, 2006 in U.S. Appl. No. 10/342,670.
U.S. Official Action mailed Jun. 30, 2006 in U.S. Appl. No. 10/437,556.
U.S. Official Action mailed Jul. 31, 2006 in U.S. Appl. No. 10/235,201.
U.S. Official Action mailed Nov. 17, 2006 in U.S. Appl. No. 10/235,201.
U.S. Official Action mailed Nov. 20, 2006 in U.S. Appl. No. 10/437,556.
U.S. Official Action mailed Dec. 18, 2006 in U.S. Appl. No. 10/008,581.
U.S. Official Action mailed Mar. 21, 2007 in U.S. Appl. No. 10/294,947.
U.S. Official Action mailed Apr. 25, 2007 in U.S. Appl. No. 10/008,581.
U.S. Official Action mailed May 3, 2007 in U.S. Appl. No. 10/437,556.
U.S. Official Action mailed May 4, 2007 in U.S. Appl. No. 10/263,160.
U.S. Official Action mailed May 4, 2007 in U.S. Appl. No. 10/924,077.
U.S. Official Action mailed May 8, 2007, in U.S. Appl. No. 10/263,449.
U.S. Official Action mailed Jul. 10, 2007 in U.S. Appl. No. 10/104,921.
U.S. Official Action mailed Jul. 10, 2007 in U.S. Appl. No. 10/263,270.
U.S. Official Action mailed Jul. 18, 2007 in U.S. Appl. No. 11/162,232.
U.S. Official Action mailed Sep. 4, 2007 in U.S. Appl. No. 10/712,289.
U.S. Official Action mailed Sep. 10, 2007 in U.S. Appl. No. 10/842,823.
U.S. Official Action mailed Oct. 4, 2007 in U.S. Appl. No. 10/008,581.
U.S. Official Action mailed Oct. 5, 2007 in U.S. Appl. No. 10/294,947.
U.S. Official Action mailed Nov. 15, 2007 in U.S. Appl. No. 10/924,077.
U.S. Official Action mailed Nov. 16, 2007 in U.S. Appl. No. 10/263,160.
U.S. Official Action mailed Nov. 29, 2007 in U.S. Appl. No. 10/104,921.
U.S. Official Action mailed Nov. 30, 2007 in U.S. Appl. No. 10/263,449.
U.S. Official Action mailed Jan. 10, 2008 in U.S. Appl. No. 10/923,948.
U.S. Official Action mailed Jan. 14, 2008 in U.S. Appl. No. 10/263,270.
U.S. Official Action mailed Jan. 29, 2008 in U.S. Appl. No. 11/162,232.
U.S. Official Action mailed Feb. 8, 2008 in U.S. Appl. No. 10/403,485.
U.S. Official Action mailed Mar. 18, 2008 in U.S. Appl. No. 10/008,581.
U.S. Official Action mailed Mar. 18, 2008 in U.S. Appl. No. 10/924,077.
U.S. Official Action mailed Mar. 19, 2008 in U.S. Appl. No. 10/712,289.
U.S. Official Action mailed Apr. 4, 2008 in U.S. Appl. No. 10/842,823.
U.S. Official Action mailed Apr. 24, 2008 in U.S. Appl. No. 10/104,921.
U.S. Official Action mailed May 13, 2008 in U.S. Appl. No. 10/263,160.
U.S. Official Action mailed May 15, 2008 in U.S. Appl. No. 10/294,947.
U.S. Offiical Action mailed Jun. 2, 2008 in U.S. Appl. No. 10/998,879.
U.S. Official Action mailed Jun. 12, 2008 in U.S. Appl. No. 10/263,449.
U.S. Official Action mailed Jun. 30, 2008 in U.S. Appl. No. 10/907,540.
U.S. Official Action mailed Jul. 8, 2008 in U.S. Appl. No. 11/069,439.
U.S. Official Action mailed Jul. 9, 2008 in U.S. Appl. No. 11/069,440.
U.S. Official Action mailed Sep. 5, 2008 in U.S. Appl. No. 11/162,232.
U.S. Official Action mailed Sep. 5, 2008 in U.S. Appl. No. 10/263,270.
U.S. Official Action mailed Sep. 17, 2008 in U.S. Appl. No. 10/403,485.
U.S. Official Action mailed Sep. 18, 2008 in U.S. Appl. No. 10/008,581.
U.S. Official Action mailed Sep. 19, 2008 in U.S. Appl. No. 10/263,160.
U.S. Official Action mailed Sep. 26, 2008 in U.S. Appl. No. 10/212,017.
U.S. Official Action mailed Oct. 21, 2008 in U.S. Appl. No. 10/842,823.
U.S. Official Action mailed Oct. 22, 2008 in U.S. Appl. No. 10/924,077.
U.S. Official Action mailed Oct. 29, 2008 in U.S. Appl. No. 10/712,289.
U.S. Official Action mailed Nov. 6, 2008 in U.S. Appl. No. 10/104,921.
U.S. Official Action mailed Nov. 26, 2008 in U.S. Appl. No. 11/069,439.
U.S. Official Action mailed Nov. 28, 2008 in U.S. Appl. No. 10/998,879.
U.S. Official Action mailed Dec. 12, 2008 in U.S. Appl. No. 10/294,947.
U.S. Official Action mailed Dec. 23, 2008 in U.S. Appl. No. 11/163,107.
U.S. Official Action mailed Jan. 7, 2009 in U.S. Appl. No. 10/904,540.
U.S. Official Action mailed Jan. 23, 2009 in U.S. Appl. No. 11/169,440.
U.S. Official Action mailed Feb. 4, 2009 in U.S. Appl. No. 10/263,449.
U.S. Official Action mailed Feb. 6, 2009 in U.S. Appl. No. 10/263,270.
U.S. Official Action mailed Feb. 9, 2009 in U.S. Appl. No. 10/008,581.
U.S. Official Action mailed Mar. 2, 2009 in U.S. Appl. No. 11/564,347.
U.S. Official Action mailed Mar. 13, 2009 in U.S. Appl. No. 11/069,439.
U.S. Official Action mailed Mar. 18, 2009 in U.S. Appl. No. 10/403,485.
U.S. Official Action mailed Mar. 20, 2009 in U.S. Appl. No. 11/162,232.
U.S. Official Action mailed Apr. 3, 2009 in U.S. Appl. No. 10/263,160.
U.S. Official Action mailed Apr. 15, 2009 in U.S. Appl. No. 10/712,289.
U.S. Official Action mailed May 21, 2009 in U.S. Appl. No. 10/294,947.
U.S. Official Action mailed May 21, 2009 in U.S. Appl. No. 10/998,879.

U.S. Official Action mailed Jun. 10, 2009 in U.S. Appl. No. 10/907,540.
U.S. Official Action mailed Jun. 11, 2009 in U.S. Appl. No. 10/104,921.
U.S. Official Action mailed Jul. 29, 2009 in U.S. Appl. No. 10/924,077.
U.S. Official Action mailed Aug. 19, 2009 in U.S. Appl. No. 11/069,440.
U.S. Official Action mailed Aug. 28, 2009 in U.S. Appl. No. 10/263,449.
U.S. Official Action mailed Sep. 1, 2009 in U.S. Appl. No. 10/263,270.
U.S. Official Action mailed Sep. 3, 2009 in U.S. Appl. No. 10/403,485.
U.S. Official Action mailed Sep. 4, 2009 in U.S. Appl. No. 11/564,347.
U.S. Official Action mailed Sep. 11, 2009 in U.S. Appl. No. 10/263,160.
U.S. Official Action mailed Sep. 29, 2009 in U.S. Appl. No. 10/712,289.
U.S. Official Action mailed Sep. 30, 2009 in U.S. Appl. No. 11/069,439.
U.S. Official Action mailed Oct. 16, 2009 in U.S. Appl. No. 12/056,812.
U.S. Official Action mailed Nov. 16, 2009 in U.S. Appl. No. 10/907,540.
Canadian Office Action dated Jul. 24, 2009 in Application No. 2,566,742.
EP Summons to attend oral proceedings dated Jan. 27, 2010 in Application No. 03 774 942.1-1241.
U.S. Official Action mailed May 1, 2008 in U.S. Appl. No. 10/923,948.
U.S. Official Action mailed Nov. 30, 2009 in U.S. Appl. No. 10/998,879.
U.S. Official Action mailed Dec. 16, 2009 in U.S. Appl. No. 10/294,947.
U.S. Official Action mailed Dec. 16, 2009 in U.S. Appl. No. 11/564,347.
U.S. Official Action mailed Jan. 14, 2010 in U.S. Appl. No. 10/104,921.
U.S Official Action mailed Jan. 21, 2010 in U.S. Appl. No. 11/069,439.
U.S. Official Action mailed Jan. 25, 2010 in U.S. Appl. No. 11/162,232.
U.S. Official Action mailed Jan. 28, 2010 in U.S. Appl. No. 10/924,077.
U.S. Appl. No. 09/332,244 filed Jun. 11, 1999 entitled "Client-Server Based Interactive Television Program Guide System With Remote Server Recording", Inventors: Michael Ellis, William Thomas, Thomas Lemmons.
U.S. Appl. No. 09/354,344 filed Jul. 16, 1999 entitled "Interactive Television Program Guide With Remote Access", Inventors: Michael Ellis, William Thomas, Joel Hassell, Thomas Lemmons, David Berezowski, Robert Knee, Robert McCoy.
U.S. Appl. No. 09/356,161 filed Jul. 16, 1999 entitled "Interactive Television Program Guide System Having Multiple Devices Within a Household", Inventors: Michael Ellis, William Thomas, Thomas Lemmons.
Supplementary European Search Report dated Jul. 14, 2005 in Application No. 03 74 5552.
EP Communication dated Mar. 10, 2008 in Application No. 05 852 294.7.
EP Communication dated Jul. 18, 2008 in Application No. 05 852 294.7.
EP Communication dated Feb. 27, 2009 in Application No. 06 739 511.1.
EP Communication dated Apr. 6, 2009 in Application No. 05 852 294.7-1522.
Canadian Office Action dated Apr. 15, 2009 in Application No. 2,478,838.
EP Communication dated Aug. 24, 2009 in Application No. 06 735 737.6-1241.
Canadian Office Action dated Oct. 5, 2009 in Application No. 2,588,912.
EP Communication dated Oct. 29, 2009 in Application No. 06 815 494.7.
Canadian Office Action dated Nov. 2, 2009 in Application No. 2,599,947.
Canadian Office Action dated Nov. 2, 2009 in Application No. 2,603,257.
Canadian Office Action dated Dec. 15, 2009 in Application No. 2,520,505.
Canadian Office Action dated Jan. 13, 2010 in Application No. 2,541,161.
Canadian Office Action dated Mar. 4, 2010 in Application No. 2,599,941.
EP Communication dated Apr. 12, 2010 in Application No. 03 777 604.4-1241.
U.S. Official Action mailed Nov. 2, 2007 in U.S. Appl. No. 10/676,968.
U.S. Official Action mailed Jul. 23, 2008 in U.S. Appl. No. 10/676,968.
U.S. Official Action mailed Dec. 26, 2008 in U.S. Appl. No. 11/164,337.
U.S. Official Action mailed Apr. 6, 2009 in U.S. Appl. No. 11/945,284.
U.S. Official Action mailed Jul. 21, 2009 in U.S. Appl. No. 11/164,337.
U.S. Official Action mailed Oct. 6, 2009 in U.S. Appl. No. 12/352,140.
U.S. Official Action mailed Oct. 29, 2009 in U.S. Appl. No. 11/945,284.
U.S. Official Action mailed Dec. 30, 2009 in U.S. Appl. No. 11/164,337.
U.S. Official Action mailed Feb. 17, 2010 in U.S. Appl. No. 10/263,449.
U.S. Official Action mailed Feb. 24, 2010 in U.S. Appl. No. 10/403,485.
U.S. Official Action mailed Mar. 1, 2010 in U.S. Appl. No. 10/712,289.
U.S. Official Action mailed Mar. 3, 2010 in U.S. Appl. No. 10/263,160.
U.S. Official Action mailed Apr. 7, 2010 in U.S. Appl. No. 12/056,812.
U.S. Official Action mailed May 5, 2010 in U.S. Appl. No. 10/998,879.
U.S. Serial No. 09/568,932 filed May 11, 2000 entitled "Electronic Content Guide Renders Content Resources Transparent", Inventors: Eugene Shteyn et al.
International Search Report dated Jun. 14, 2006 in PCT/US2006/006201.
International Search Report dated Sep. 28, 2006 in PCT/US2006/010764.
International Search Report dated Jan. 25, 2007 in PCT/US2006/037542.
Written Opinion dated Jan. 25, 2007 in PCT/US2006/037542.
International Search Report dated Oct. 29, 2007 in PCT/US2006/060967.
Written Opinion dated Oct. 29, 2007 in PCT/US2006/060967.
International Search Report dated Jun. 9, 2008 in PCT/US2007/085694.
EP Communication dated Mar. 18, 2010 in Application No. 06 815 494.7.
Canadian Office Action dated Jul. 2, 2010 in Application No. 2,630,123.
U.S. Official Action mailed May 31, 2005 in U.S. Appl. No. 09/332,244.
U.S. Official Action mailed Sep. 20, 2006 in U.S. Appl. No. 10/036,329.
Official Action mailed Dec. 19, 2006 in U.S. Appl. No. 09/332,244.
U.S. Official Action mailed May 29, 2007 in U.S. Appl. No. 10/036,329.
U.S. Official Action mailed Jun. 27, 2007 in U.S. Appl. No 09/332,244.

U.S. Official Action mailed May 18, 2010 in U.S. Appl. No. 10/907,540.
U.S. Official Action mailed May 25, 2010 in U.S. Appl. No. 11/069,439.
U.S. Official Action mailed May 26, 2010 in U.S. Appl. No. 10/263,270.
U.S. Official Action mailed Jun. 8, 2010 in U.S. Appl. No. 11/564,347.
U.S. Official Action mailed Jul. 16, 2010 in U.S. Appl. No. 11/164,337.
U.S. Official Action mailed Jul. 27, 2010 in U.S. Appl. No. 10/924,077.
U.S. Official Action mailed Aug. 17, 2010 in U.S. Appl. No. 12/036,329.
U.S. Official Action mailed Aug. 20, 2010 in U.S. Appl. No. 11/945,284.
U.S. Official Action mailed Aug. 27, 2010 in U.S. Appl. No. 10/403,485.
U.S. Official Action mailed Aug. 31, 2010 in U.S. Appl. No. 12/416,392.
U.S. Official Action mailed Sep. 9, 2010 in U.S. Appl. No. 10/998,879.
U.S. Appl. No. 09/262,870 filed Mar. 4, 1999 entitled "Program Guide System with Video-On-Demand Browsing," Inventors: Michael D. Ellis.
Canadian Office Action dated Oct. 14, 2010 in Application No. 2,501,112.
U.S. Official Action mailed Oct. 15, 2010 in U.S. Appl. No. 10/907,540.
U.S. Official Action mailed Nov. 10, 2010 in U.S. Appl. No. 10/263,270.

* cited by examiner

NETWORKED MULTIMEDIA SYSTEM

CROSS-REFERENCE TO RELATED PATENT APPLICATIONS

The present application incorporates by reference in its entirety herein U.S. provisional application having Ser. No.: 60/416,155, which was filed on Oct. 4, 2002, and U.S. provisional application having Ser. No.: 60/424,269, which was filed on Nov. 6, 2002. Also, the present application is a continuation-in-part of copending U.S. patent applications having Ser. Nos. 10/263,160, 10/263,449, and 10/263,270, which were filed on Oct. 2, 2002 and are assigned to a common assignee, the teachings of which are hereby incorporated by reference.

FIELD OF THE INVENTION

This invention relates in general to broadband communications systems, and more particularly, to the field of set-top terminals and a networked multimedia system.

DESCRIPTION OF THE RELATED ART

Broadband communications systems, such as satellite and cable television systems, are now capable of providing many services in addition to analog broadcast video. In implementing enhanced programming, the set-top terminal (STT), otherwise known as the set-top box, has become an important computing device for accessing various video services. In addition to supporting traditional analog broadcast video functionality, many STTs now also provide other functionality, such as, for example, an interactive program guide (IPG), video-on-demand (VOD), subscription video-on-demand (SVOD) and functionality traditionally associated with a conventional computer, such as e-mail. Recently new functionality has been added to conventional STTs—namely the ability to video record an incoming video stream in digitized form onto a mass storage device such as a hard dish drive, and playback that recorded video as desired by the user. This functionality has become known as a "digital video recorder" (DVR) or personal video recorder (PVR) and is viewed as a superior alternative to conventional video tape recorders for capture and subsequent playback of programming content.

An STT is typically connected to a communications network (e.g., a cable or satellite television network) and includes hardware and software necessary to provide various services and functionality. Preferably, some of the software executed by an STT is downloaded and/or updated via the communications network. Each STT also typically includes a processor, communication components, and memory, and is connected to a television or other display device. While many conventional STTs are stand-alone devices that are externally connected to a television, an STT and/or its functionality may be integrated into a television or other device, as will be appreciated by those of ordinary skill in the art.

An STT is typically connected to a television set and located at the home of the cable or satellite system subscriber. Since the STT is located in the subscriber's premises, it typically may be used by two or more users (e.g., household members). Television has become so prevalent in the United States, however, that the typical household may have two or more television sets, each television set requiring its own STT if the subscriber wishes to have access to enhanced functionality. However, STTs can be expensive and users may not be willing to purchase additional expensive STTs. This is particularly true of STTs incorporating PVR functionality since such devices require not only the addition of a hard disk drive but also additional processing components and software.

Therefore, there exists a need for systems and methods for addressing these and/or other problems associated with STTs. Specifically, there exists a need for systems and methods that allow multiple subscribers operating discrete STTs within a subscriber premises or other local area to have access to programming and content received by and/or stored in another STT.

BRIEF DESCRIPTION OF THE DRAWINGS

The invention can be better understood with reference to the following drawings. The components in the drawings are not necessarily drawn to scale, emphasis instead being placed upon clearly illustrating the principles of the invention. In the drawings, like reference numerals designate corresponding parts throughout the several views.

DETAILED DESCRIPTION OF THE PREFERRED EMBODIMENTS

Preferred embodiments of the invention can be understood in the context of a broadband communications system and a local network. Note, however, that the invention may be embodied in many different forms and should not be construed as limited to the embodiments set forth herein. For example, transmitted broadband signals include at least one of video/audio, telephony, data, or Internet Protocol (IP) signals, to name but a few. Furthermore, remote devices included in the broadband communications system receiving the transmitted broadband signals may include a remote set-top terminal, a television, a consumer electronics device such as a DVD player/recorder, a computer, a personal digital assistant (PDA), or other device. All examples given herein, therefore, are intended to be non-limiting and are provided in order to help clarify the description of the invention.

The present invention is directed towards a networked multimedia system (NMS) that is suitable for use in a broadband communications system. The NMS is typically located within a subscriber premise. It will be appreciated, however, that the NMS can also be used in a multi-unit dwelling, business, school, hotel, or hospital, among others. Advantageously, the NMS allows the premise to be locally networked (i.e., home-networked). In accordance with the present invention a primary set-top terminal (STT) typically receives and forwards broadband multimedia content signals (e.g., digital or analog cable television channels (i.e., audio/video signals), IP signals, VOD signals, software application signals, administrative signals, etc.) throughout the local network to a plurality of remote devices. Additionally, the remote devices are each capable of requesting from the primary STT and seamlessly receiving, for example, a cable channel, a stored or recorded presentation, a VOD movie, or the interactive program guide, just as if the remote devices were equipped with the primary STT functionality. In other words, the remote devices may be simplified, less-costly versions of the primary STT but are capable of utilizing, via the local network, some or all of the advanced hardware and software features, such as memory, a mass storage device, or software applications, that are available in the primary STT. A broadband communications system that is suitable in implementing a preferred embodiment of the present invention is described hereinbelow.

An Example of a Broadband Communications System

Figure 1:
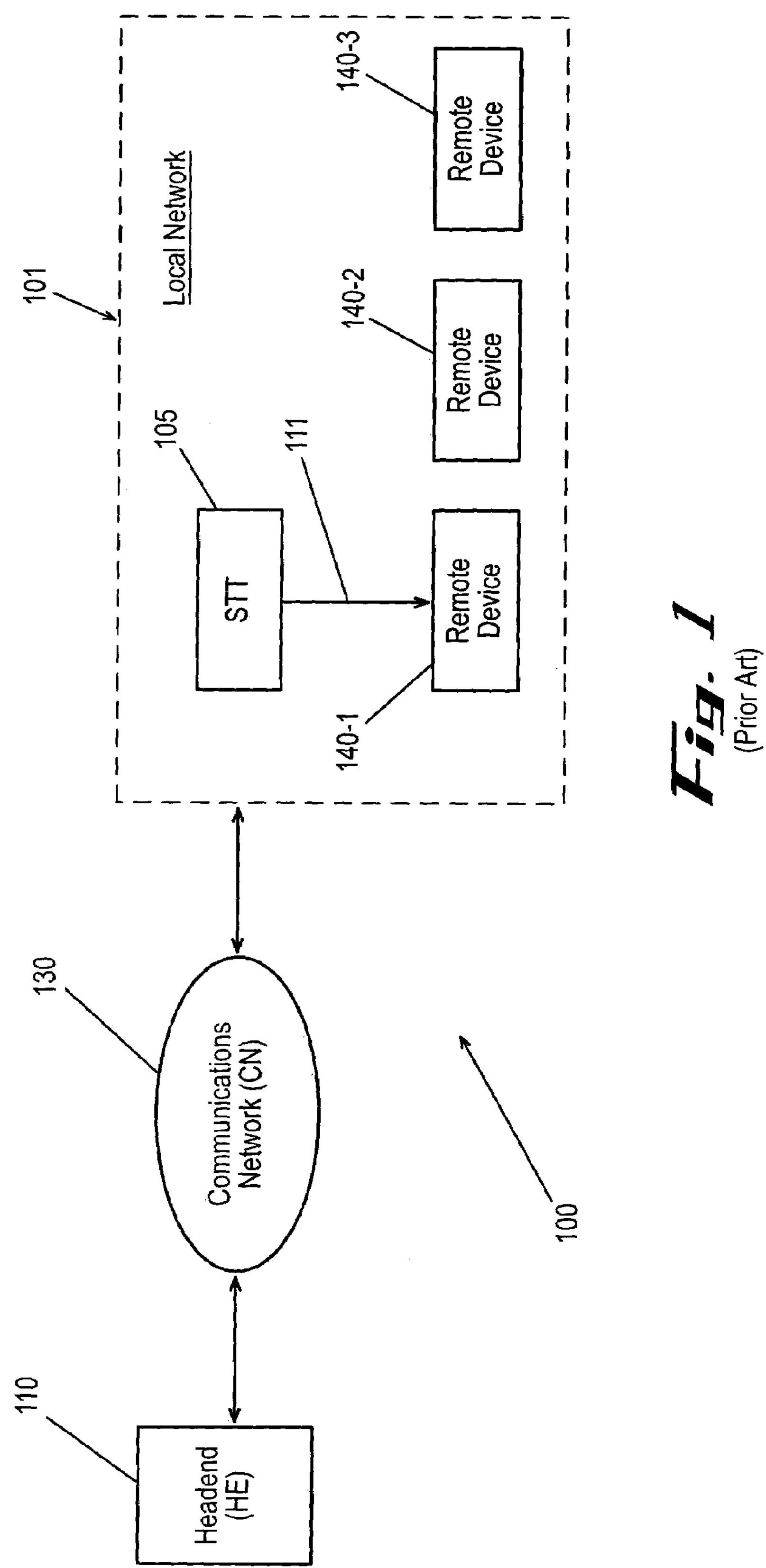
FIG. 1 is a simplified block diagram depicting a non-limiting example of a conventional broadband communications system.

FIG. 1 is a simplified block diagram depicting a non-limiting example of a conventional broadband communications system 100. In this example, the communications system 100 includes a headend 110 that is coupled to a local network (LN) 101 via a communications network (CN) 130. The CN 130 may be any network that is suitable for transmitting preferably downstream and upstream broadband multimedia signals, such as audio/video signals, IP signals, telephony signals, or data signals to name but a few. The CN 130 may be, for example, a hybrid fiber/coax (HFC) network, a fiber-to-the-home (FTTH) network, a satellite network, or a fixed wireless network (e.g., MMDS), among others.

The LN 101 includes a set-top terminal (STT) 105 that provides the broadband signals to the remote devices 140-1 and 140-2, and, optionally, to additional remote devices including, for example, remote device 140-3. The STT 105 may be coupled to the remote devices either directly or via one or more other devices. It will be appreciated that the STT 105 may be a stand-alone unit or may be integrated into another device, such as, for example, a television or a computer. Additionally, the remote devices may be located in different rooms than where the STT 105 is located. Further information regarding the LN 101 is provided in copending U.S. patent application Ser. Nos. 10/263,160; 10/263,270; and 10/263,449, which were filed on Oct. 2, 2002, the disclosure and teachings of which are hereby incorporated in their entirety by reference.

The headend 110 may include one or more server devices (not shown) for providing video, audio, and/or data signals to the STT 105 via the CN 130. The headend 110 and the STT 105 cooperate to provide a user with a variety of services via the remote devices 140-i (e.g., 140-1, 140-2, and/or 140-3 ). The services may include, for example, analog or digital television services and channels, video-on-demand (VOD) services, and/or pay-per-view (PPV) services, among others. Each broadcast television channel typically provides a sequence of television presentations corresponding to a television station (e.g., ABC, NBC, CBS, or FNN, to name a few) and is typically identified by a channel number (e.g., channel 2, channel 3, channel 4, etc.). Additionally, a television station (e.g., the Fox News Network) that is identified by a certain channel number (e.g., channel 84) to viewers served by a first service provider may be identified by another channel number (e.g., channel 45) to viewers served by a second service provider.

A preferred embodiment of the present invention may be implemented in addition to or replacement of the local network 101 of FIG. 1. The present invention will now be described in detail.

Figure 2:
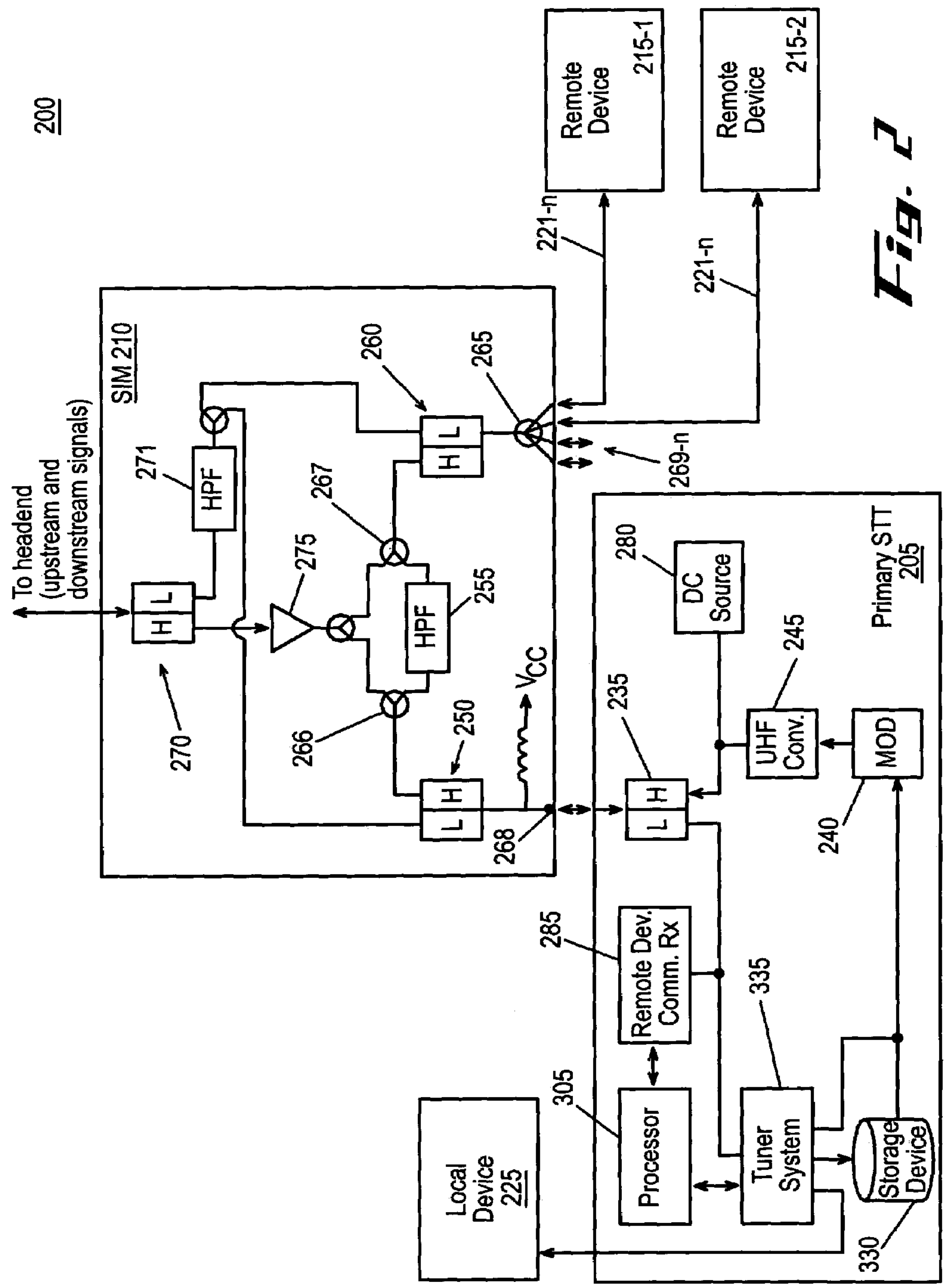
FIG. 2 is a block diagram illustrating one preferred embodiment of a networked multimedia system (NMS) in accordance with the present invention.

FIG. 2 is a block diagram illustrating one preferred embodiment of a networked multimedia system (NMS) 200 in accordance with the present invention. The NMS 200 includes a master or primary STT 205, a splitter/isolation module (SIM) 210, and a plurality of remote devices, e.g., 215-1, 215-2, 215-n. It is to be noted that while the embodiment of FIG. 2 illustrates an NMS having but two remote devices, the invention is not so limited. Indeed, any number of such remote devices may be employed, consistent with the requirements and capabilities of the NMS, as described herein. Briefly, the SIM 210 receives downstream broadband signals from, for example, the headend or satellite and subsequently provides the downstream signals to the primary STT 205 or to both the primary STT 205 and any one or all of the plurality of remote devices 215-n depending on the implementation. Upon command, the primary STT 205 may also forward selected real-time downstream signals or stored signals to one or all of the remote devices 215-n via the SIM 210. More specifically, the plurality of remote devices 215-n communicates with the primary STT 205 by sending reverse control/command signals via coaxial cable 220, 221-n requesting stored presentations or real-time signals. It will be appreciated that other wired mediums, such as telephone lines or data cables, may be used so long as the transport format accommodates the desired transmission medium. Advantageously, in accordance with the present invention, the plurality of remote devices 215-n have access to all of the primary STT's hardware and software functionality, along with receiving downstream signals directly from the headend via the SIM 210. In this manner, the remote devices 215-n may have limited functionality, thereby decreasing the overall costs to the service provider and the subscriber while offering advanced services to all of the remote devices that are networked.

Furthermore, the primary STT 205 may also directly provide broadband signals to a coupled local device 225, which may be, for example, a television, computer, or PDA. It will be appreciated that the primary STT 205 may transmit signals to and receive control signals from the local device 225 via wireless devices (e.g., RF or IR devices) or a wired medium (e.g., coaxial cable, power lines, or telephone lines). It will also be appreciated that the primary STT 205 may be incorporated in the local device 225. The primary STT 205 optionally includes, for example, an IR receiver 368 (FIG. 3) for receiving user input control signals (e.g., signals indicating a channel change, IPG display, volume control, or administrative signals) that are encoded in an IR signal. Those of ordinary skill in the art would understand elements and operation of a typical IR receiver 368. Further information regarding the transmitting and receiving of signals between the primary STT and the coupled local device via wireless devices or a wired medium can be found in copending U.S. patent application Ser. No. 10/008,581, the teachings of which are hereby incorporated by reference.

A Preferred Embodiment of the Primary STT 205

Figure 3:
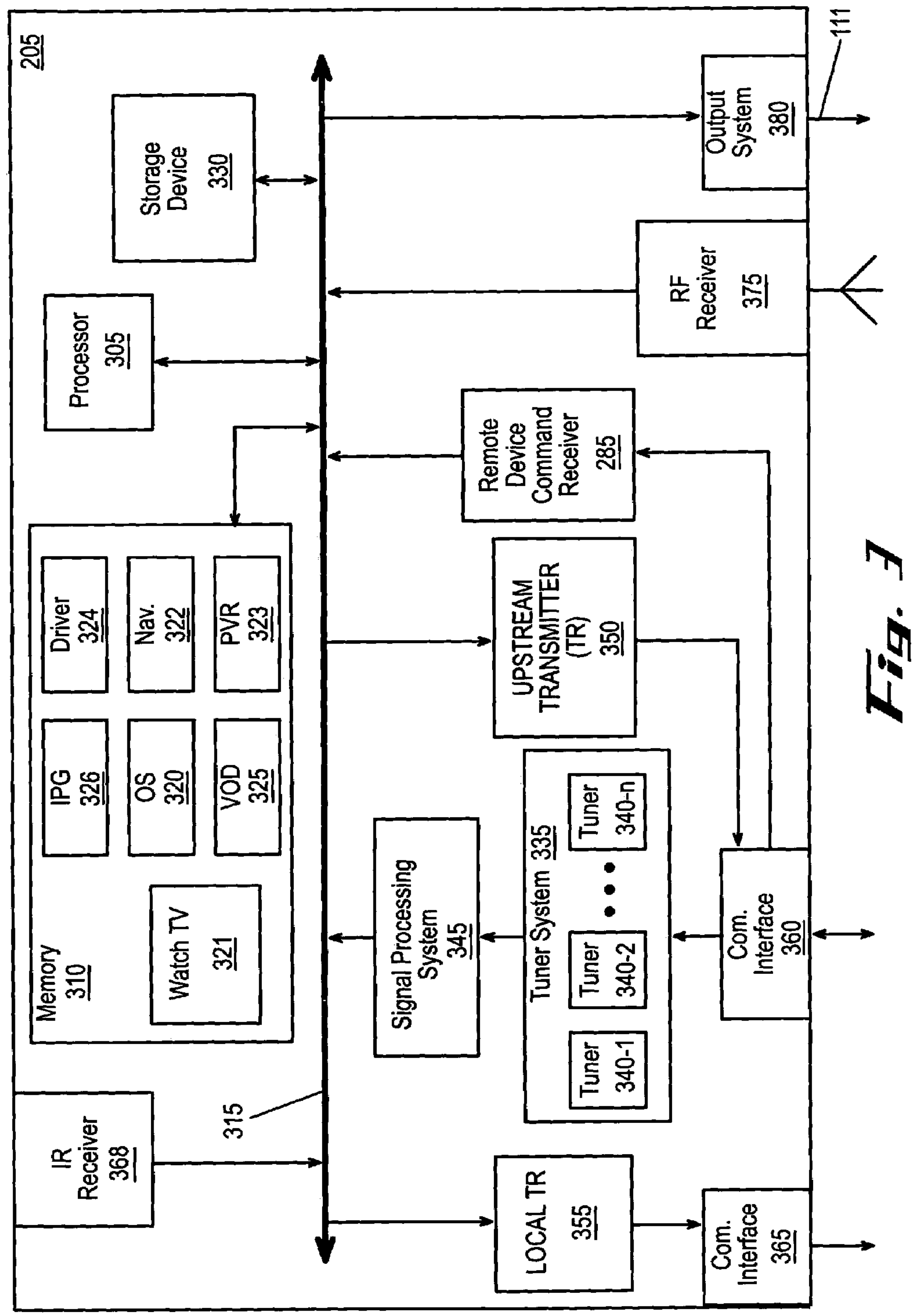
FIG. 3 is a simplified, non-limiting block diagram illustrating selected components of a primary STT in accordance with one preferred embodiment of the present invention.

FIG. 3 is a simplified, non-limiting block diagram illustrating selected components of a primary STT 205 in accordance with one preferred embodiment of the present invention. In other embodiments, a primary STT 205 may include only some of the components shown in FIG. 3, in addition to other components that are not shown in FIG. 3. The primary STT 205 has electronic components (e.g., processor 305, memory 310, etc.) that are coupled to a local interface 315, which can include, for example, one or more buses or other wired or wireless connections. The processor 305 is a hardware device for executing software, particularly that stored in memory 310. The processor 305 can be a custom-made or commercially available processor for executing software instructions. When the primary STT 205 is in operation, the processor 305 is configured to execute software stored within the memory 310, to communicate data to and from the memory 310, and to generally control operations of the primary STT 205 according to the software.

The memory system 310 may include any one or combination of volatile memory elements (e.g., random access memory (RAM), dynamic RAM (DRAM), static RAM (SRAM), synchronous DRAM (SDRAM), magnetic RAM (MRAM), etc.) and nonvolatile memory elements (e.g., read only memory (ROM), hard drive, tape, compact disc ROM (CD-ROM), etc.). Moreover, the memory system 310 may incorporate electronic, magnetic, optical and/or other types of storage multimedia. Note that the memory system 310 can have a distributed architecture, where various memory components are situated remotely from one another, but can be accessed by the processor 305.

The software in memory 310 may include one or more separate programs, each of which comprises executable instructions for implementing logical functions. In the example of FIG. 3, the software in memory 310 includes an operating system (OS) 320, a WatchTV application 321, a navigator application 322, a personal video recorder (PVR)/digital video recorder (DVR) application 323, a driver 324, a VOD application 325, and an IPG application 326, among others. The OS 320 controls the execution of other software and provides management and control services including, for example, scheduling, input-output control, file and data management, memory management, and communication control. The WatchTV application 321 is used to help provide a user with a requested broadcast television channel. The EPG application 326 provides an interactive program guide that mainly includes listings of television channels provided by the primary STT 205, but may also present additional services, such as an NMS interactive guide. The navigator application 322 is used to route user input commands to respective software applications that have registered with the navigator application 322 to receive the respective commands. The VOD application 325 provides a user with video-on-demand presentations, such as, for example, movies that are selected via an on-screen movie catalog. The PVR application 323 may provide user interface (UI) screens that can be used to manage (e.g., record, playback, and delete) the content of a storage device 330. Accordingly, the PVR application 323 may record or delete data from the storage device 330 with the help of a software driver 324, which controls read and write operations performed on the storage device 330. In one preferred embodiment, the storage device 330 includes a hard drive that reads from and writes to a hard disk. It will be appreciated that other software applications may be included in memory 310.

A tuner system 335 includes, in one implementation, an out-of-band tuner (not shown) for receiving out-of-band signals (e.g., administrative signals that were modulated using quadrature phase shift keying (QPSK)), and a plurality of in-band tuners 340-n (e.g., quadrature amplitude modulation (QAM)/analog tuners) for receiving analog and/or digital in-band television channels. Alternatively, the tuner system 335 may only include one in-band tuner depending on a desired implementation. A signal processing system 345 may be capable of demodulating, demultiplexing, decrypting, and decoding signals that are tuned to by the tuner system 335. Although shown as one module, the signal processing system may comprise multiple modules that are located in different parts of the primary STT 205. It will be appreciated that in the preferred embodiment of the present invention the number of tuners 340-n typically corresponds to at least the optional coupled local device(s) 225 and the storage device 330. Further information regarding adding additional tuners can be found in copending U.S. patent application Ser. No. 10/263,449, which was filed on Oct. 2, 2002, the teachings of which are hereby incorporated by reference.

The primary STT 205 also includes an upstream transmitter 350 and a local transmitter 355. The upstream transmitter 350, which may alternatively be included in the tuner system 335, preferably includes a QPSK/QAM modulator (not shown) that is used to transmit the upstream data to the CN 130 (FIG. 1). The local transmitter 355 preferably includes a UHF (ultra high frequency) modulator for modulating, for example, a television channel that is output to the local device 255 (FIG. 2) through an optional interface 365, such as for example an Ethernet wireless device, depending on a desired implementation.

The primary STT 205 may also include an IR receiver 368, a remote device command receiver 285, and/or an RF receiver 375, which detect respective signals (IR, electric, or wireless RF) having encoded remote control commands requesting television services, channels, or other NMS services. In one embodiment, the remote device command receiver 285 may forward received remote control signals from the plurality of remote devices 215-n to the processor 305, which then, for example, routes the commands to respective applications for processing.

An output system 380 may be used to encode television services that are to be output to, for example, local device 225 (FIG. 2), which may be a television or computer, via the connection 111. The output system 380 may provide a television 225 with signals that are in, for example, NTSC (National Television Standard Committee) format. In another embodiment, if the television 225 is a digital television, for example, a high definition television (HDTV), then the output system may include an MPEG (Motion Picture Expert Group) encoder for encoding television service signals in an MPEG-2 format. It will be appreciated that the primary STT 205 may also provide multimedia content signals to other remote devices (e.g., a computer, a remote set-top terminal, or a PDA) located in the network, such as illustrated in FIG. 1.

Referring to FIG. 2 in conjunction with FIG. 3, the primary STT 205 receives via the SIM 210 downstream broadband signals (i.e., signals that are typically in the range from 45 MHz to 870 MHz). A low pass filter in diplex filter 235 provides the downstream signals to the tuner system 335 and the remote device command receiver 285. Upon command from the processor 305, the tuner system 335 may send the downstream signals to any local devices 225, the storage device 330 for optional storage, and additionally to a modulator 240. More specifically, the processor 305 instructs the tuner system 335 to extract specified content signals from the downstream signals. By way of example, a tuner 340 responsive to the coupled local device 225 provides selected content signals directly to the local device 225. The tuner 340 or a plurality of tuners 340-n that are responsive to a remote device 215-n via the processor 305 may forward selected real-time presentations directly to the modulator 240 for transmission to the plurality of remote devices 215-n. Furthermore, upon user input from the primary STT 205 or any one of the remote devices 215-n, the processor 305 may instruct the tuner system 335 to provide content presentations to the storage device 330 for storage. The stored presentations are subsequently available for forwarding to any of the remote devices 215-n and/or the local device 255 upon instruction from the processor 305. User input signals will be discussed in further detail hereinbelow relating with a preferred embodiment of the remote devices 215-n.

Figure 4:
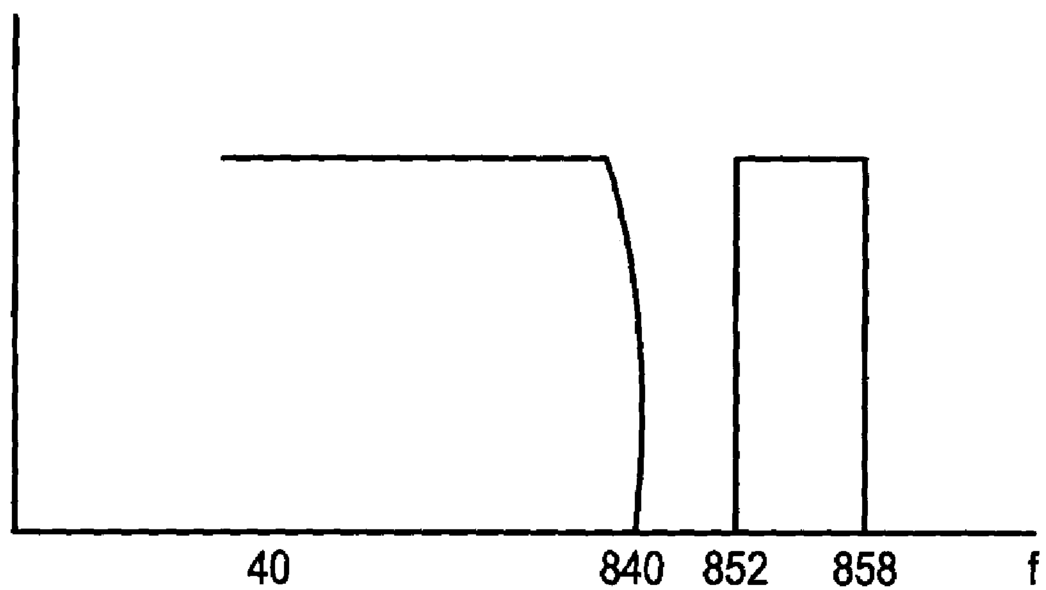
FIG. 4 illustrates an example of a graph of the frequencies of the downstream broadband signals and the predetermined frequencies of the up-converted selected signals.

In accordance with the present invention, the modulator 240 modulates the selected content signals (i.e., NMS presentations) provided from either the tuner system 335 or the storage device 330 prior to forwarding to the SIM 210. For example, a preferred embodiment of the present invention uses a QAM modulator, which may be used for effectively transmitting signals over coaxial cable in a cable television environment. Other embodiments may include a QPSK modulator in a satellite environment, an 8VSB (8-vestigial sideband) modulator in a digital terrestrial environment in the U.S., and a COFDM (coded orthogonal frequency division multiplexing) modulator in a digital terrestrial environment in Europe, or alternatively an analog modulator. The modulator 240 converts the signals to a predetermined intermediate frequency. Subsequently, the modulated presentations are up-converted to a predetermined higher frequency that is preferably greater than the highest frequency used in the system with, for example, a UHF converter 245. FIG. 4 illustrates an example of a graph of the conventional frequencies of the downstream broadband signals 403 and the predetermined frequencies of the up-converted NMS presentations 405. A preferred embodiment of the present invention is to up-convert the NMS presentations to an available high frequency channel, for example, channel 134, which may have a frequency range from 852 MHz to 858 MHz. The service provider, therefore, would provide downstream signals in the range from 45 MHz to approximately 840 MHz, thereby leaving frequencies greater than 840 MHz available for the transmission of NMS presentations. Accordingly, the NMS presentations 405 do not interfere with the downstream signals that may be concurrently provided via the common coax 220, 221-n to the primary STT 205 and the remote devices 215-n. It will be appreciated that other frequency ranges can be used that are either in-band (e.g., from 45 MHz to 860 MHz) or out-of-band (e.g., from 865 MHz to 1 GHz) so long as the predetermined frequency range is not used for transmission of the downstream signals or is within the range that is tunable by the plurality of remote devices 215-n. The up-converted NMS presentations are subsequently provided to the SIM 210 via a high pass filter in the diplex filter 235.

Furthermore, the remote device command receiver 285 is included in the primary STT 205 for receiving reverse NMS command signals from the plurality of remote devices 215-n. Command signals will be discussed further hereinbelow; however, the command signals can be transmitted in the form of on-off keying (OOK) signals, frequency shift keying (FSK) signals, or serial data transmissions, among others. The remote device command receiver 285, therefore, includes the respective demodulator, such as an OOK demodulator or an FSK demodulator that demodulates the signals as known to one skilled in the art.

Additionally, an optional DC source 280, which may supply, for example, 12 to 15 volts (V) and 200 milliamps (mA), may be provided to power an amplifier 275 located the SIM 210, if necessary. If required, the amplifier 275 amplifies the downstream signals received from the CN 130. It will be appreciated that if the SIM 210 is a passive splitter/isolation module, the DC source 280 is not necessary.

Preferred Embodiments of the SIM 210

Referring again to FIG. 2, the selected NMS presentations are provided by the primary STT 205 to the SIM 210 via the coaxial cable 220. In a first embodiment of the lo SIM 210, the selected NMS presentations are routed to the plurality of remote devices 215-n via a diplex filter 250. A splitter 266 provides the NMS presentations to HPF 255, which subsequently provides the filtered NMS presentations to splitter 267, diplex filter 260, and splitter 265. The high pass filter (HPF) 255 has low attenuation at the frequencies of the NMS presentation and high isolation at lower frequencies, and thus, provides high isolation between port 268 and ports 269-n at these lower frequencies. It will be appreciated that a bandpass filter (BPF) can alternatively be used depending on the transmission frequencies of the NMS presentations. Splitter 265 provides the NMS presentations to the plurality of remote devices 215-n. It will be appreciated that, at the frequencies of the NMS presentations, splitters 266 and 267 provide low insertion loss between port 268 and the splitter 265, thereby ensuring the NMS presentations are routed to the plurality of remote devices 215-n. Additionally, in an active SIM 210, the amplifier 275 further prevents the NMS presentations from reaching the CN 130.

Moreover, diplex filters 250 and 270 provide a path for upstream signals from the primary STT 205 to the headend. Similarly, diplex filters 260 and 270 provide a path for upstream signals from the plurality of remote devices 215-n to the headend. A high pass filter 271 allows any upstream signals (e.g., signals ranging from 5 MHz to 45 MHz) to pass through to the diplex filter 270 on to the CN 130. It will be appreciated that the reverse signals intended to remain in the NMS 200, such as reverse command signals from the remote devices 215-n, are reflected back and routed to the primary STT 205. Furthermore, the SIM 210 receives the downstream broadband signals from the headend 110 at diplex filter 270, which provides the downstream signals to the primary STT 205 or, alternatively, to both the primary STT 205 and the plurality of remote devices 215-n.

Figure 9:
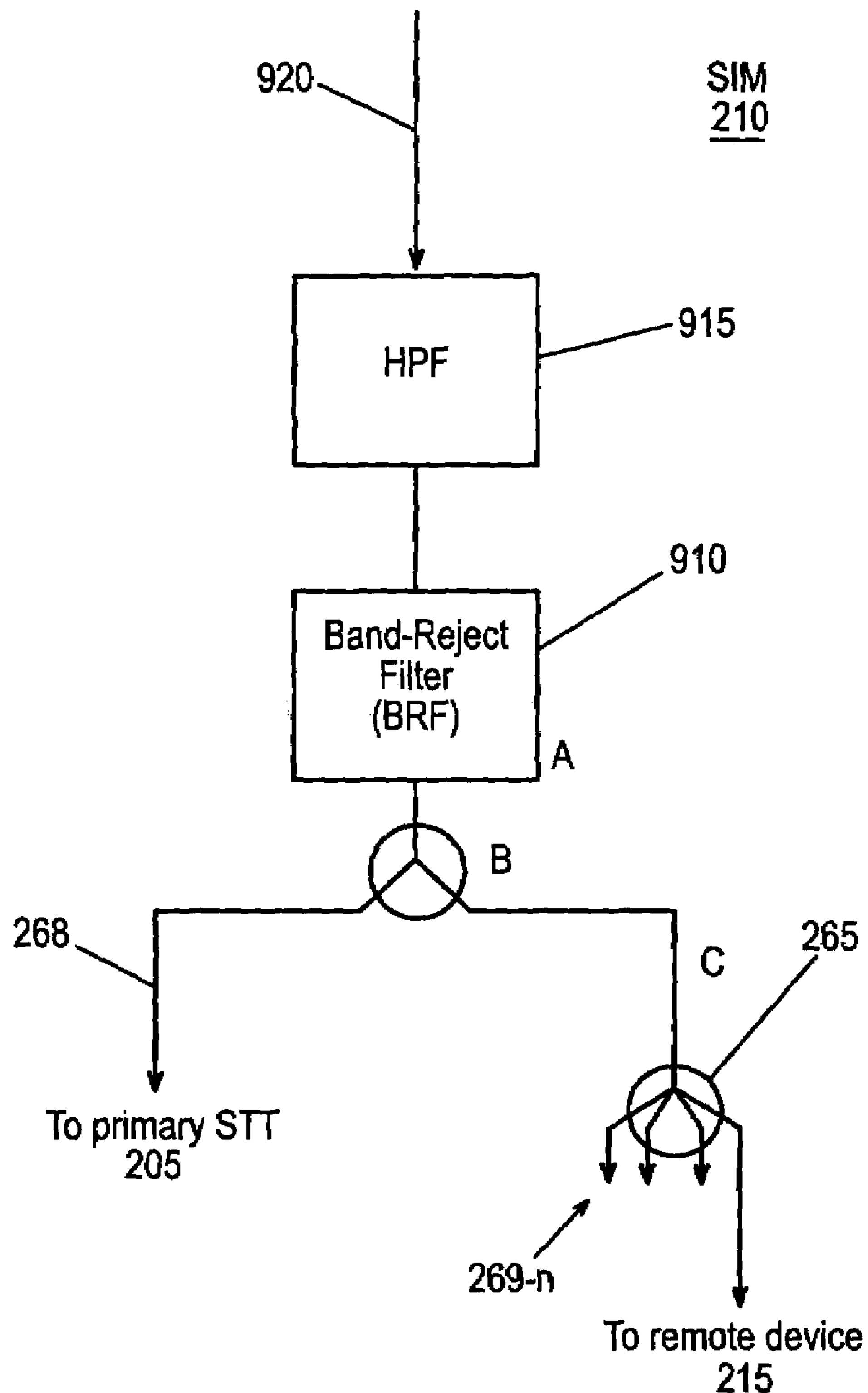
FIG. 9 illustrates a block diagram of a second embodiment of the SIM 210 comprising passive splitter/isolation components in accordance with the present invention.

FIG. 9 illustrates a block diagram of a second embodiment of a SIM 210 comprising passive splitter/isolation components in accordance with the present invention. More specifically, the NMS presentations from the primary STT 205 are provided to SIM 210 via port 268. A band reject filter (BRF) 910 rejects the frequencies of the selected NMS presentations (e.g., from 852 MHz to 858 MHz), thereby not allowing the presentations to leave the network 200. It will be appreciated that the NMS presentations are reflected off the BRF 910 and routed to the splitter 265 for transmission to the plurality of remote devices 215-n. It will be appreciated that there is a high insertion loss between a SIM port 269-n and the primary STT input port 268 at all other frequencies. A high pass filter (HPF) 915 is included to ensure that the reverse command signals provided by the plurality of remote devices 215-n are reflected and routed to the primary STT 205 and not transmitted to the CN 130.

Notably, the preferred embodiments of the SIM 210 provide protection against any of the reverse command signals from leaving the NMS 200, thereby ensuring proper delivery to the primary STT 205 while also avoiding any interference with separate networked multimedia systems that may be in close proximity. A further advantage is that the SIM 210 enhances privacy and security by making the NMS 200 unobservable to any upstream devices in the CN 130.

A Preferred Embodiment of a Remote Device 215-n

Figure 5:
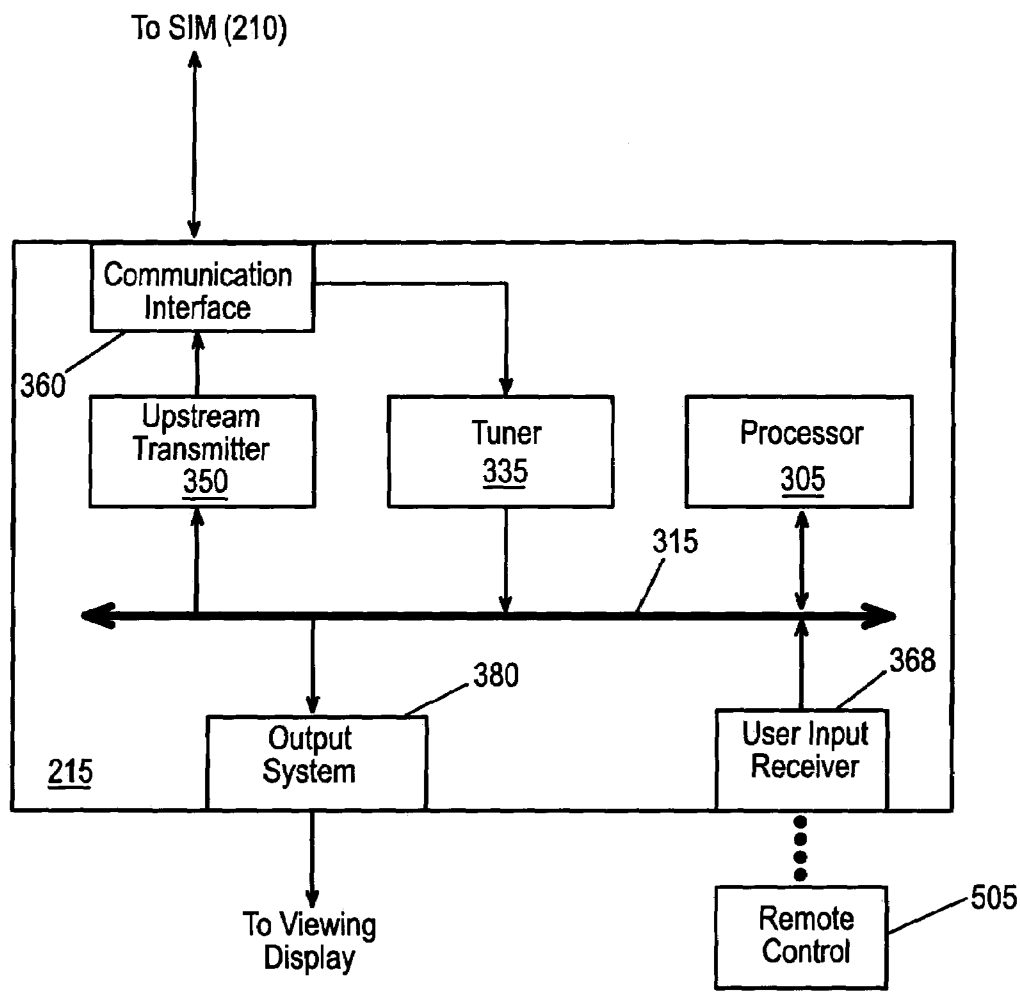
FIG. 5 is a simplified diagram of one preferred embodiment of a remote STT device.

FIG. 5 is a simplified diagram of one preferred embodiment of a remote STT device 215-n. It will be appreciated that the remote devices 215-n may be identical to the primary STT 205 and just share the storage device contents of the primary STT 205. Alternatively, the remote devices 215-n may be a simplified or conventional version of the primary STT 205. A processor 305 and a tuner system 335, which may be a simplified processor and only one tuner, may be included to extract channels from the received downstream broadband signals. Additionally, decryptors and decoders (not shown) may be included to decode encoded signals for proper processing and display. Furthermore, the remote devices 215-n may or may not include memory. Preferably, the remote devices 215-n include a user input receiver 368, such as an IR receiver or an RF receiver, that receives signals from a remote control, such as an IR remote control or an RF remote control. It will be appreciated that the remote control 505 is not required, and any user input device could be incorporated in the remote devices 215-n.

As mentioned, the reverse command signals, which typically originate from user input signals (e.g., tuned channels, NMS functions, or IPG display) or generated administrative signals (e.g., turn-on signals), could be processed using various methods depending upon the type of remote control used. By way of example, if an RF remote control is used, the RF signals could be modulated to a desired frequency that does not interfere with any downstream or upstream signals that are transmitted via the common coaxial cable 221-n. There may be, however, RF interference issues between the remote control and other RF devices in the area. Alternatively, if an IR remote control device is used, RF interference is not an issue. The IR signals do, however, require modulation with a carrier frequency and subsequently multiplexed onto the coaxial cable 221-n. Accordingly, this will prevent the requirement of running separate reverse command transmission media to accommodate the serial data streams, such as twisted pair cable, from each remote device 215-n to the SIM 210. It will be appreciated that if the user input signals indicate non-NMS signals, for example, a channel change or volume change, the remote device 215-n processes and performs the operation internally. In other words, these types of user input signals are not routed throughout the NMS 200.

Notably, in accordance with the present invention, the reverse command signals are transmitted via the coaxial cable 221-n that is routed between each remote device 215-n and the SIM 210. A preferred embodiment of the present invention processes and transmits the reverse command signals that are indicative of user input commands using frequency shift keying (FSK) and utilizes existing components that are typically included in a conventional remote set-top terminal. As mentioned, a QPSK modulator is typically included in the upstream transmitter 350 for modulating conventional upstream signals, which are signals ranging from 5 MHz to 40 MHz, for transmission to the headend and, in accordance with the present invention, for modulating the reverse command signals that are routed throughout the NMS 200. Preferably, the existing QPSK modulator modulates the reverse command signals to an FSK signal at a frequency that is below the conventional upstream signals (i.e., below 5 MHz). In this manner, the reverse command signals do not interfere with conventionally transmitted upstream signals that may be provided from the remote devices 215-n.

Figure 6:
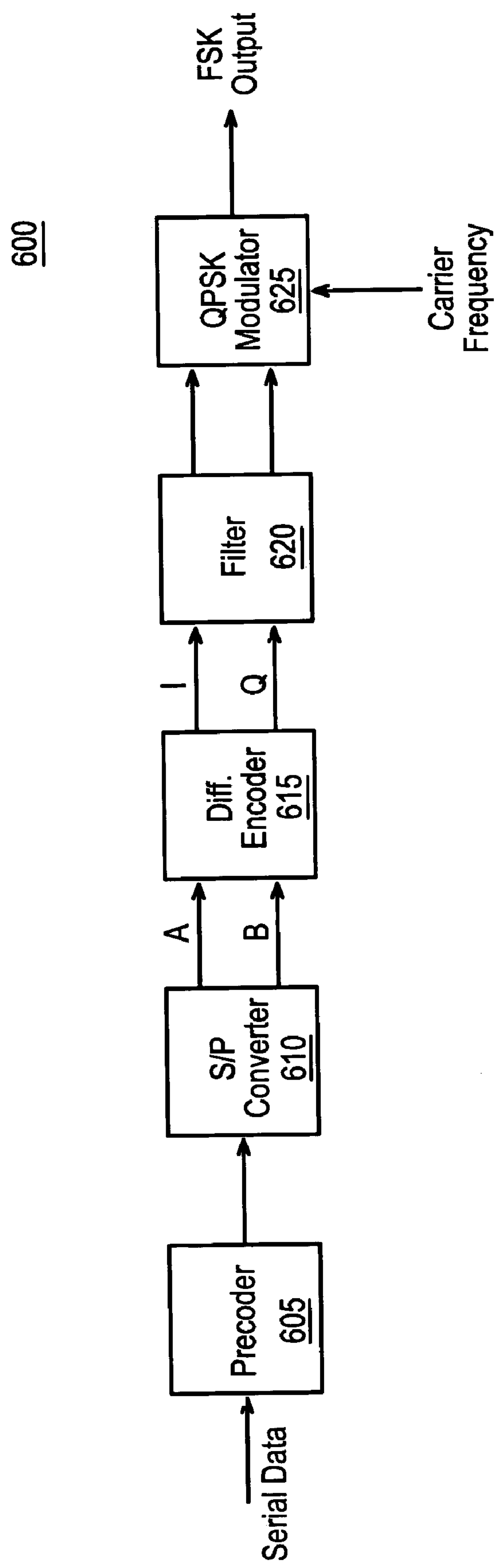
FIG. 6 is a block diagram illustrating one preferred embodiment of a QPSK transmitter that converts user input command signals into FSK signals for transmission to the splitter/isolation module (SIM).

FIG. 6 is a block diagram illustrating one preferred embodiment of a QPSK transmitter 600 that converts user input command signals into FSK signals for transmission to the SIM 210. The user input command signals, such as a channel change, request for an IPG display, request for a stored presentation, etc., are presented from the user input receiver 368 to the QPSK transmitter 600 as serial data. In conventional QPSK transmitters, the input serial data is converted to parallel signals (A, B), and the parallel signals are subsequently mapped directly to a phase change A(p by a differential encoder. An example is shown in Table 1.

TABLE 1

| Input Serial Data A B | $\Delta\phi$ |
|---|---|
| 0 0 | 0 |
| 0 1 | $+\pi/2$ |
| 1 0 | $-\pi/2$ |
| 1 1 | $\pi$ |

The output of the conventional QPSK transmitter is, therefore, a QPSK modulated output signal. Disadvantageously, however, the receiving equipment, such as would be required in the primary STT 205, is complex and expensive. On the other hand, the present invention includes a precoder 605 that precodes the input serial data to generate a frequency shift keyed signal, thereby requiring a less complex, inexpensive receiver in the primary STT 205.

In accordance with the present invention, the precoder 605 operates on the input serial data to produce, for example, 2 symbols for each input bit. By way of example, the input serial data, x(n), may be changed to output serial data, x'(n), as follows:

$$\text{when } x(n)=1\text{: } x'(n)=[01\ 01]\text{; and}$$

$$\text{when } x(n)=0\text{: } x'(n)=[10\ 10],$$

where the sample time of the input x is, in this example, 4 times that of the output x'. For x(n)=1, therefore, the precoder 605 generates two symbols with each symbol producing a phase change of $+\pi/2$ (as shown in Table 1), and a total phase change of $\pi$. Similarly, for x(n) =0, the precoder 605 generates two symbols with each symbol producing a phase change of $-\pi/2$, and a total phase change of $-\pi$. It will be appreciated that the output serial data, x'(n), may be any arbitrary number of symbols, such as four symbols for an input bit, and the phase changes may be different than shown in Table 1 so long as the change is significant enough that the FSK demodulator in the command receiver 285 in the primary STT 205 can detect the change in frequency. Additionally, the precoder 605 does not have to be a dedicated piece of hardware; the precoder 605 can be used elsewhere within the remote terminal 215-n. Furthermore, the precoder 605 can be, for example, a look-up table that is stored in memory, or it can be hardware, such as logic gates. The precoded signals are provided to a serial-to-parallel (S/P) converter 610 for providing parallel signals (A, B). A differential encoder 615 receives the A and B bits and encodes them according to the phase changes shown in the example Table 1 to provide mapped I and Q bits. An optional filter 620 may be used to shape the I/Q pulse. A carrier frequency is modulated by the I and Q bits via a QPSK modulator 625 to provide the FSK output signals at a desired frequency, such as, for example, in the range from 2 MHz to 4.5 MHz.

It will be appreciated that the QPSK transmitter 600 may be enabled only when there are reverse command signals being transmitted, thereby enabling a way of preventing collisions between remote devices 215-n. Further embodiments of collision avoidance will be discussed further below. Additionally, the remote command signals may be encrypted and, therefore, decrypted accordingly in the command receiver 285. Further information regarding encryption/decryption can be found in copending U.S. patent application Ser. No. 10/154,495, which was filed on May 24, 2002 and is assigned to a common assignee, the teachings of which are hereby incorporated by reference.

Figure 7:
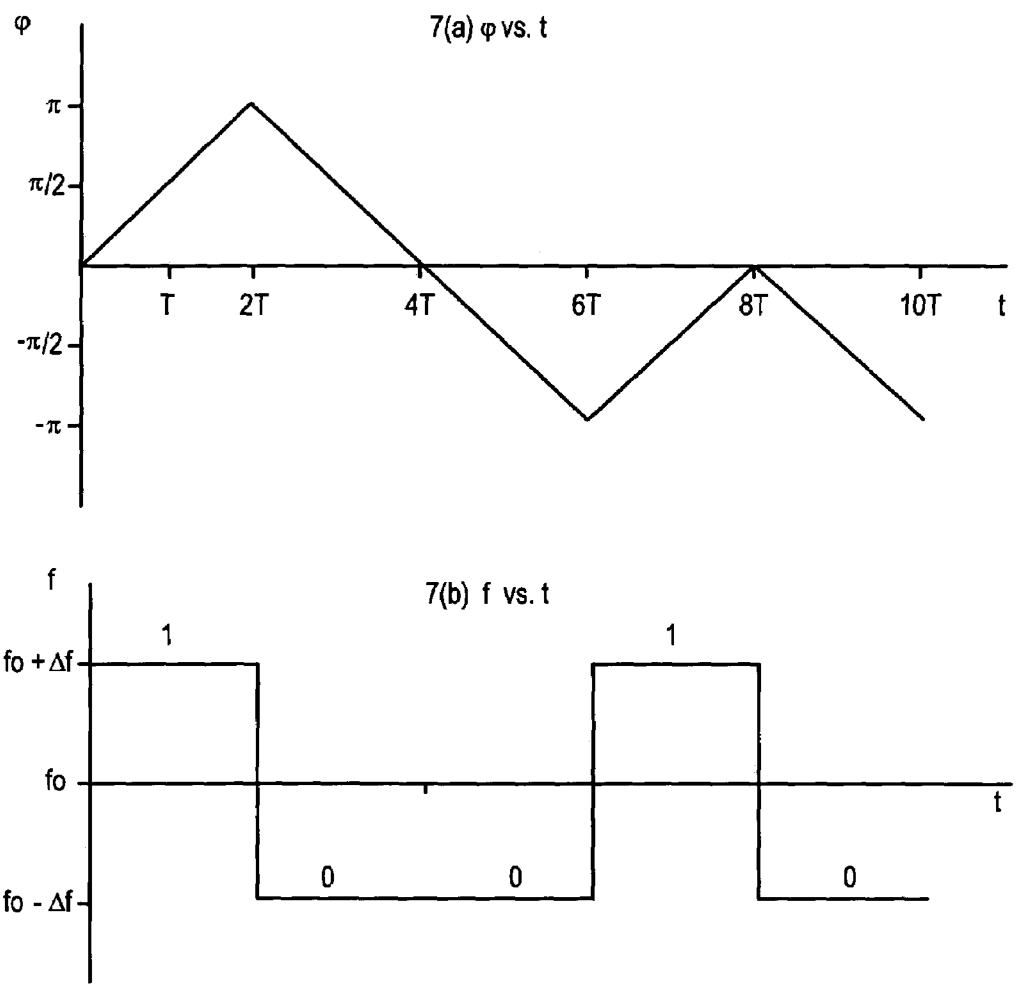
FIG. 7 illustrates generation of an FSK signal for input serial data x(n)=[10010].

FIG. 7 illustrates generation of an FSK signal for input serial data x(n)=[10010]. Graph 7(*a*) illustrates the phase vs. the time over the duration of each symbol, which is shown to be linear, however, this is not required. As per the previous example, x(1)=[01 01], which corresponds to a total phase change of $+\pi$. The next input serial bit, x(0), is converted to [10 10], which corresponds to a total phase change of $-\pi$. Similarly, the next input serial bit, x(0), corresponds to a total phase change of $-\pi$, and so forth. As can be seen, graph 7(*b*) illustrates a single positive value when x(n)=1, and a single negative value when x(n)=0. This constitutes the FSK signal. Note that, since the phase of the signal is continuous, the FSK signal generated may be designated as a continuous-phase FSK signal (CPFSK). It will be appreciated that there are further embodiments of an FSK transmitter. By way of example, an FSK transmitter could include a direct digital frequency synthesizer with two selectable frequency words.

Figure 8:
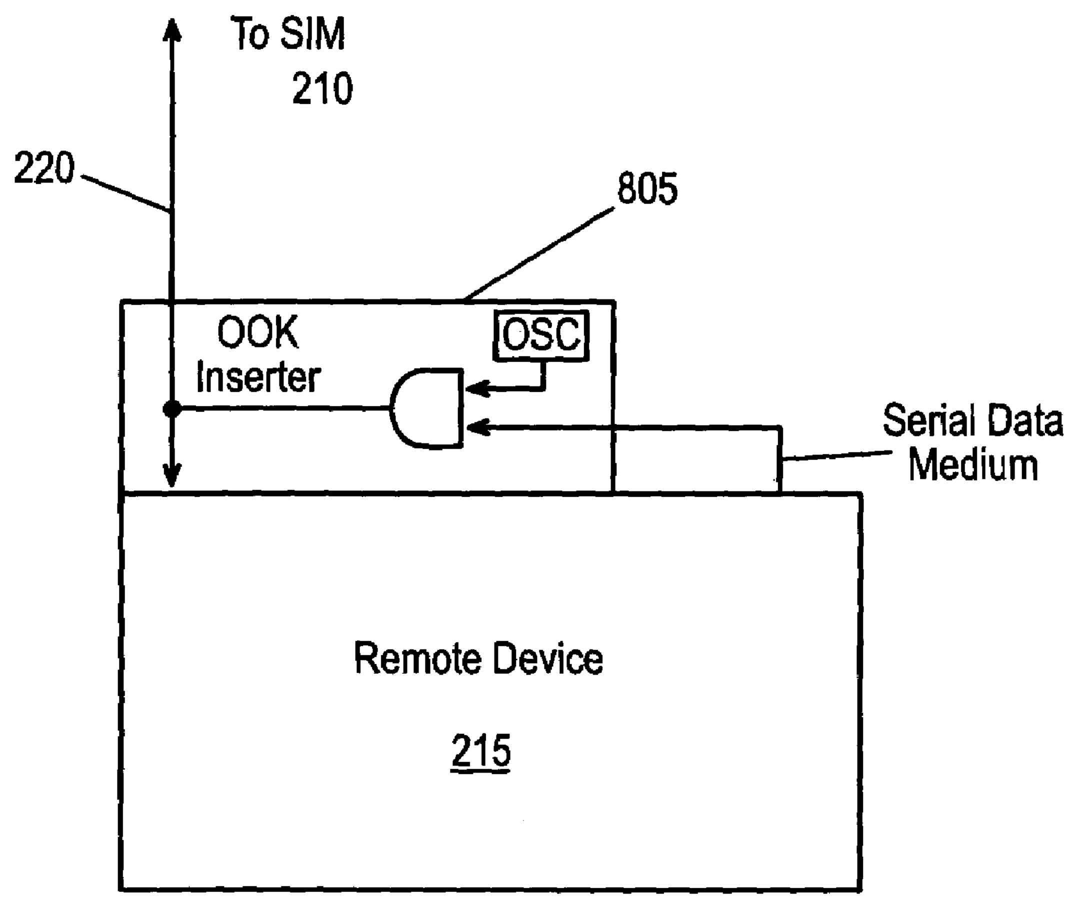
FIG. 8 illustrates a second embodiment of the present invention for transmitting reverse command signals as OOK signals over the coaxial cable to the SIM.

FIG. 8 illustrates a second embodiment of the present invention for transmitting reverse command signals as OOK signals over the coaxial cable 221-n to the SIM 210. An on-off keying (OOK) inserter device 805 is either internally or externally added to the conventional remote device 215 for producing a modulated serial data stream that is suitable for transmission over coaxial cable. A logic gate 810 receives the serial data stream, which is indicative of the user input command signals, and an oscillator 815 provides an oscillated input signal at a specified frequency, such as 2 MHz. The logic gate 810 essentially gates the serial data stream to provide a modulated signal according to the user input signals for transmission over the coaxial cable 221-n.

Referring again to FIG. 2, the reverse command signals from each of the plurality of remote devices 215-n are provided to the primary STT 205 via the diplex filters 260, 250 in the SIM 210. The remote device command receiver 285 receives the reverse command signals and instructs the primary STT 205 to provide return NMS presentations accordingly. A preferred embodiment of the command receiver 285 includes an FSK demodulator. It will be appreciated, however, that the receiver 285 can include any demodulator that is in accordance with the reverse command signal transmission technique.

After processing, the command receiver 285 sends signals indicative of the reverse command signal to the processor 305. By way of example, if a remote device 215-n requests the latest IPG or a list of the stored presentations, the processor 305 accesses the IPG display or the list via the navigational interface 322, which subsequently forwards the IPG or the list to the requesting remote device 215-n. The remote device 215-n may then, upon user input, select a presentation from the IPG or the stored presentations. For example, upon receipt of the reverse command signals indicative of a selected stored presentation, the processor 305 extracts the selected presentation from the storage device 330 and transmits the presentation to the remote device 215-n via the modulator 240. The remote device 215-n tunes to the modulator frequency and waits for the response (i.e., the stored presentation). Notably, in accordance with the present invention a remote device 215-n that views a stored presentation is capable of utilizing advanced features via the primary STT 205, such as play, pause, fast-forward, or rewind functions, with the selected presentation. More specifically, a remote device 215-n receives user input indicating one of the play, pause, fast-forward, or rewind signals and forwards the reverse command signals indicative of the user input signals to the primary STT 205. The processor 305 subsequently performs the function relating to the user input signals on the stored presentation that is being viewed, such as, for example, pausing transmission of the stored presentation until further commands are received.

A further example is a remote device 215-n that requests a video-on-demand (VOD) presentation from a headend server via the primary STT 205. It will be appreciated that if the remote device 215-n is a broadcast-only device, it is incapable of transmitting upstream signals to the headend. In this case and in accordance with the present invention, the broadcast-only device 215-n may transmit reverse command signals to the primary STT 205, which acts as a gateway device. Subsequent to processing the command signals, the primary STT 205 may transmit upstream signals that are indicative of the command signals to the headend server. For instance, the remote device 215-n selects a presentation from a displayed VOD list and transmits the reverse command signals to the primary STT 205. The primary STT 205 processes the signals and subsequently transmits upstream signals to the headend server requesting the particular VOD presentation. The VOD presentation is then transmitted along with the downstream signals to the primary STT 205, which may optionally store the presentation on the storage device 330, and, either concurrently or subsequently, forward the VOD presentation to the requesting broadcast-only remote device 215-n. Alternatively, the requesting remote device 215-n can extract the VOD presentation with an included tuner from the downstream signals using, for example, a predetermined channel frequency or other identifying convention.

Collision avoidance between the remote devices 215-n can be significantly improved in several ways. A preferred embodiment of the present invention, however, utilizes the asynchronous input data bits as an inexpensive way to transmit the reverse command signals from the plurality of remote devices 215-n to the primary STT 205. More specifically, the user input data is a sequence of asynchronous characters called a cell. Each cell contains a preamble, which is followed by several characters. The characters include, for example, one start bit, eight data bits, and one stop bit. An example may be that a low logical level represents a start bit or a data bit 0; a high logical level represents a stop bit or data bit 1. The eight data bits are the reverse command signals. After modulation by the QPSK transmitter 600, the FSK asynchronous signals are provided to the primary STT 205. A demodulator (not shown) included in the command receiver 285 demodulates the signals and provides the demodulated signals to a universal asynchronous receiver/transmitter (UART) (not shown) for framing into data bytes using the asynchronous characters. Advantageously, by using the asynchronous data, the command receiver 285 does not need time to synchronize with a remote device's reference clock. It will be appreciated that other collision avoidance and collision recovery methods exist and can replace or further enhance the above-described embodiment of the present invention. These methods are known to one skilled in the art.

It should be emphasized that the above-described embodiments of the invention are merely possible examples, among others, of the implementations, setting forth a clear understanding of the principles of the invention. Many variations and modifications may be made to the above-described embodiments of the invention without departing substantially from the principles of the invention. All such modifications and variations are intended to be included herein within the scope of the disclosure and invention and protected by the following claims. In addition, the scope of the invention includes embodying the functionality of the preferred embodiments of the invention in logic embodied in hardware and/or software-configured mediums.

What is claimed is:

1. A network system, comprising:

a splitter/isolation module (SIM) configured to receive downstream multimedia signals originating from an external source, the downstream multimedia signals being received in a first frequency range;

a primary set-top terminal (STT) coupled to the SIM via a first link, the primary STT being configured to receive downstream multimedia signals in the first frequency range from the external source via the SIM over the first link, the primary STT comprising a tuner system configured to extract selected content signals from the downstream multimedia signals, at least a portion of the selected content signals being processed to generate output signals for presentation on a first local device; and at least one remote device coupled to the SIM via a second link, the at least one remote device being configured to receive downstream multimedia signals in the first frequency range directly from the external source via the SIM over the second link without the downstream multimedia signals being routed through the primary STT, wherein the at least one remote device is configured to process received multimedia signals to generate output signals for presentation on a second local device, and wherein the at least one remote device is configured to send reverse command signals to the primary STT in a second frequency range that does not overlap the first frequency range, the reverse command signals being routed over the second link, through the SIM, and over the first link to the primary STT;

the primary STT further comprising:

a storage device configured to store at least a portion of the selected content signals extracted by the tuner system;

a remote device command receiver configured to receive the reverse command signals from the at least one remote device; and a modulator configured to modulate selected content signals from the tuner system or the storage device for transmission to the at least one remote device in response to the remote device command receiver receiving a reverse command signal requesting the selected content signals, wherein modulated content signals are frequency converted to a third frequency range that does not overlap the first and second frequency ranges, the modulated content signals being routed over the first link, through the SIM, and over the second link to the at least one remote device, wherein the at least one remote device is configured to process received modulated content signals to generate output signals for presentation on the second local device, wherein the SIM further comprises:

a first diplex filter coupled to the first link;

a second diplex filter coupled to the second link; and a third diplex filter coupled to an interface with the external source;

wherein:

a first filter of the first diplex filter is coupled to a first filter of the third diplex fitter to provide a first signal path for the downstream multimedia signals from the external source to the primary STT;

a first filter of the second diplex filter is coupled to the first filter of the third diplex filter to provide a second signal path for the downstream multimedia signals from the external source to the at least one remote device; and the first filter of the first diplex filter is coupled to the first filter of the second diplex filter to provide a third signal path for the modulated contents signals from the primary STT to the at least one remote device.

2. The network system of claim 1, wherein:

the SIM, the primary STT, and the at least one remote device are located within a premises.

3. The network system of claim 1, wherein the primary STT and the at least one remote device are further configured to send outbound signals to the external source via the SIM in a fourth frequency range that does not overlap the first, second, and third frequency ranges.

4. The network system of claim 1, wherein the SIM further comprises:

a frequency filter disposed in the third signal path between the first and second diplex filters and configured to pass signals in the third frequency range and reject signals in the first frequency range.

5. The network system of claim 4, further comprising:

first, second, and third splitters, wherein the first and second splitters are disposed in the third signal path between the first and second diplex filters, the first and third splitters are disposed in the first signal path between the first and third diplex filters, and the second and third splitters arc disposed in the second signal path between the second and third diplex filters.

6. The network system of claim 5, wherein the frequency filter is disposed between the first and second splitters.

7. The network system of claim 1, wherein:

a second filter of the first diplex filter is coupled to a second filter of the third diplex filter to provide a fourth signal path for the outbound signals from the primary STT to the external source; and a second filter of the second diplex filter is coupled to the second filter of the third diplex filter to provide a fifth signal path for the outbound signals from the at least one remote device to the external source.

8. The network system of claim 7, wherein a common signal path comprises a portion of the fourth signal path and a portion of the fifth signal path, the SIM further comprising:

a frequency filter disposed in the common signal path and configured to pass signals in the fourth frequency range and reject signals in the second frequency range.

9. The network system of claim 8, wherein the SIM further comprises:

a splitter disposed at a junction between the fourth and fifth signal paths, wherein reverse command signals in the second frequency range originating from the at least one remote device are routed over the fifth signal path and reflected by the frequency filter to the fourth signal path and received by the primary STT.

10. The network system of claim 1, wherein the modulator is one of a QAM modulator, a QPSK modulator, an 8 VSB modulator, and a COFDM modulator.

11. The network system of claim 1, wherein the first and second links comprise coaxial cables.

12. The network system of claim 1, wherein the reverse command signals are transmitted in an on-off keying (OOK) format or in a frequency shift keying (FSK) format.

13. The network system of claim 1, wherein the modulated content signals are a stored presentation, a video-on-demand (VOD) presentation, an interactive program guide (IPG) application, a networked multimedia system (NMS) application, or a television channel.

14. The network system of claim 1, wherein the first and second local devices are configured to receive at least one tuned presentation selected from the downstream multimedia signals, wherein the first and second local devices provide the at least one tuned presentation to a viewing display.

15. The network system of claim 1, wherein the at least one remote device is capable of performing, via the primary STT, play, pause, fast-forward, rewind, and stop functions on a stored presentation.

16. The network system of claim 1, wherein the at least one remote device is another set-top terminal.

17. A method for operating a networked multimedia system including a primary set-top terminal (STT), at least one remote device, and a splitter/isolation module (SIM) coupled to the primary STT via a first link and coupled to the at least one remote device via a second link, the method comprising:

(a) supplying, to the primary STT over the first link in a first frequency range, downstream multimedia signals received by the SIM from an external source;

(b) extracting, in the primary STT, selected content from the downstream multimedia signals for presentation on a first local device;

(c) supplying, to the at least one remote device over the second link in a first frequency range, downstream multimedia signals received by the SIM from the external source without the downstream multimedia signals being routed through the primary STT;

(d) extracting, in the at least one remote device, selected content from the downstream multimedia signals for presentation on a second local device;

(e) routing a reverse command signal from the at least one remote device to the primary STT over the second link, through the SIM, and over the first link, the reverse command signal being supplied in a second frequency range that does not overlap the first frequency range;

(f) extracting, in the primary STT, selected content from the downstream multimedia signals for storage within the primary STT;

(g) modulating selected content extracted from the downstream multimedia signals or selected content previously stored in the primary STT in response to the primary STT receiving the reverse command signal, wherein modulated content signals are frequency converted to a third frequency range that does not overlap the first and second frequency ranges;

(h) routing the modulated content signals from the primary STT to the at least one remote device over the first link, through the SIM, and over the second link; and (i) processing the modulated content signals in the at least one remote device for presentation on the second local device, wherein the SIM includes a first diplex filter coupled to the first link, a second diplex filter coupled to the second link, and a third diplex filter coupled to an interface with the external source, and wherein:

supplying, to the primary STT over the first link in the first frequency range, the downstream multimedia signals comprises routing the downstream multimedia signals from the external source to the primary STT on a first path in the SIM between the first and third diplex filters;

supplying, to the at least one remote device over the second link in the first frequency range, the downstream multimedia signals comprises routing the downstream multimedia signals from the external source to the at least one remote device on a second path in the SIM between the second and third diplex filters; and routing the modulated content signals comprises routing the modulated content signals from the primary STT to the at least one remote device on a third path in the SIM between the first and second diplex filters.

18. The method of claim 17, further comprising:

(j) sending outbound signals from the primary STT and from the at least one remote device to the external source via the SIM in a fourth frequency range that does not overlap the first, second, and third frequency ranges.

19. The method of claim 17, wherein (h) further comprises:

passing the modulated content signals through a frequency filter disposed in the third signal path, the frequency filter passing signals in the third frequency range and rejecting signals in the first frequency range.

20. The method of claim 17, wherein (g) includes modulating with QAM modulation. QPSK modulation, 8 VSB modulation, or COFDM modulation.

21. The method of claim 17, wherein (f) includes transmitting the reverse command signals in an on-off keying (OOK) format or in a frequency shift keying (FSK) format.

22. The method of claim 17, wherein the modulated content signals are a stored presentation, a video-on-demand (VOD) presentation, an interactive program guide (IPG) application, a networked multimedia system (NMS) application, or a television channel.

23. The method of claim 17, wherein the at least one remote device is capable of performing, via the primary STT, play, pause, fast-forward, rewind, and stop functions on a stored presentation.

24. A network system, comprising:

a splitter/isolation module (SIM) configured to receive downstream multimedia signals originating from an external source, the downstream multimedia signals being received in a first frequency range;

a primary set-top terminal (STT) coupled to the SIM via a first link, the primary STT being configured to receive downstream multimedia signals in the first frequency range from the external source via the SIM over the first link, the primary STT comprising a tuner system configured to extract selected content signals from the downstream multimedia signals, at least a portion of the selected content signals being processed to generate output signals for presentation on a first local device; and at least one remote device coupled to the SIM via a second link, the at least one remote device being configured to receive downstream multimedia signals in the first frequency range directly from the external source via the SIM over the second link, wherein the at least one remote device is configured to process received multimedia signals to generate output signals for presentation on a second local device, and wherein the at least one remote device is configured to send reverse command signals to the primary STT in a second frequency range that does not overlap the first frequency range, the reverse command signals being routed over the second link, through the SIM, and over the first link to the primary STT;

the primary STT further comprising:

a storage device configured to store at least a portion of the selected content signals extracted by the tuner system;

a remote device command receiver configured to receive the reverse command signals from the at least one remote device; and a modulator configured to modulate selected content signals from the tuner system or the storage device for transmission to the at least one remote device in response to the remote device command receiver receiving a reverse command signal requesting the selected content signals, wherein modulated content signals are frequency converted to a third frequency range that does not overlap the first and second frequency ranges, the modulated content signals being routed over the first link, through the SIM, and over the second link to the at least one remote device, wherein the at least one remote device is configured to process received modulated content signals to generate output signals for presentation on the second local device, wherein the SIM further comprises:

a first diplex filter coupled to the first link;

a second diplex filter coupled to the second link; and a third diplex filter coupled to an interface with the external source;

wherein:

a first filter of the first diplex filter is coupled to a first filter of the third diplex fitter to provide a first signal path for the downstream multimedia signals from the external source to the primary STT; and a first filter of the second diplex filter is coupled to the first filter of the third diplex filter to provide a second signal path for the downstream multimedia signals from the external source to the at least one remote device.

25. The network system of claim 24, wherein the first filter of the first diplex filter is coupled to the first filter of the second diplex filter to provide a third signal path for the modulated contents signals from the primary STT to the at least one remote device.

* * * * *